United States Patent [19]

Gerstenfeld et al.

[11] Patent Number: 5,200,901
[45] Date of Patent: Apr. 6, 1993

[54] DIRECT ENTRY AIR TRAFFIC CONTROL SYSTEM FOR ACCIDENT ANALYSIS AND TRAINING

[75] Inventors: Arthur Gerstenfeld, Newton; Charles Millet, Amesbury; Thomas D. Moody, Norwood; Erich Ma, Watertown, all of Mass.

[73] Assignee: UFA, Inc., Newton, Mass.

[21] Appl. No.: 628,436

[22] Filed: Dec. 17, 1990

Related U.S. Application Data

[63] Continuation-in-part of Ser. No. 176,639, Apr. 1, 1988, Pat. No. 4,979,137, which is a continuation-in-part of Ser. No. 931,867, Nov. 18, 1986, Pat. No. 4,827,418.

[51] Int. Cl.$^5$ ............................................. G06F 15/48
[52] U.S. Cl. ..................... 364/439; 364/578; 395/905
[58] Field of Search ............... 364/439, 578; 395/50, 395/905

[56] References Cited

U.S. PATENT DOCUMENTS

| | | | |
|---|---|---|---|
| 3,775,767 | 11/1973 | Fielding | 364/456 |
| 4,063,037 | 12/1977 | Heffernan et al. | 179/7.1 R |
| 4,104,512 | 8/1978 | Strayer | 364/439 |
| 4,649,388 | 3/1987 | Atlas | 342/26 |
| 4,706,198 | 11/1987 | Thurman | 364/439 |
| 4,827,418 | 5/1989 | Gerstenfeld | 364/439 |
| 4,890,232 | 12/1989 | Mundra | 364/439 |
| 4,949,267 | 8/1990 | Gerstenfeld et al. | 364/439 |
| 4,979,137 | 12/1990 | Gerstenfeld et al. | 364/578 |
| 5,025,382 | 6/1991 | Artz | 364/439 |

OTHER PUBLICATIONS

Perry, "Air Traffic Control, Improving the World's Largest, Most Advanced System," pp. 22-36, IEEE Spectrum, Feb. 1991.

N. V. Findler, "Air Traffic Control: A Challenge for Artificial Intelligence," AI Expert, Jan. 1987.

D. J. Hartzband & F. J. Maryanski, "Enhancing Knowledge Representation in Engineering Databases," IEEE, Sep. 1985.

S. J. Andriole, "Applications in Artificial Intelligence," Artificial Intelligence, 1985.

F. Hayes-Roth, "The Knowledge-Based Expert System: A Tutorial," Computer, vol. 17, No. 9, Sep. 1984.

Primary Examiner—Thomas G. Black
Attorney, Agent, or Firm—Finnegan, Henderson, Farabow, Garrett & Dunner

[57] ABSTRACT

A site-selectable air traffic control system and method for interacting with a user, the system and method generating a representation of at least one moving aircraft having an initial position and heading with respect to a selected site for producing a dynamic simulation of an air traffic scenario to monitor air traffic in real time and provide expert instruction when necessary, and to analyze air traffic at the selected site. The site selected may consist of one of a plurality of stored sites or a modification of one of those sites. Controller commands issued by a user are entered for altering the air traffic scenario. The air traffic scenario may be based on actual flight patterns of aircraft within the air space corresponding to the selected site. Rules and procedures stored in a general knowledge base and a site-specific knowledge base are compared to the present state of the simulation of the air traffic scenario or to the controller command by an expert system for issuing a warning upon the immediate or foreseeable failure to observe any rule or procedure in the knowledge bases.

15 Claims, 20 Drawing Sheets

FIG. 13

| AIRCRAFT ID | TIME | SPEED | X-COORDINATE | Y-COORDINATE | FLIGHT TIME |
|---|---|---|---|---|---|
| USA 515 | 12:59:23 | 191 | 14.50 | 1.00 | 10:00 |
| EAL 597 | 12:59:23 | 230 | 14.50 | 11.80 | 4:00 |
| USA 515 | 12:59:28 | 189 | 13.40 | 2.20 | 11:00 |
| EAL 597 | 12:59:28 | 220 | 13.00 | 11.80 | 3:00 |
| USA 515 | 12:59:33 | 187 | 12.80 | 3.20 | 12:00 |
| EAL 597 | 12:59:33 | 217 | 12.80 | 11.50 | 2:00 |
| USA 515 | 12:59:37 | 184 | 11.20 | 5.00 | 13:00 |
| EAL 597 | 12:59:37 | 208 | 11.20 | 11.50 | 1:00 |
| ... | ... | ... | ... | ... | ... |

1312, 1313, 1314, 1315, 1316 — 1310

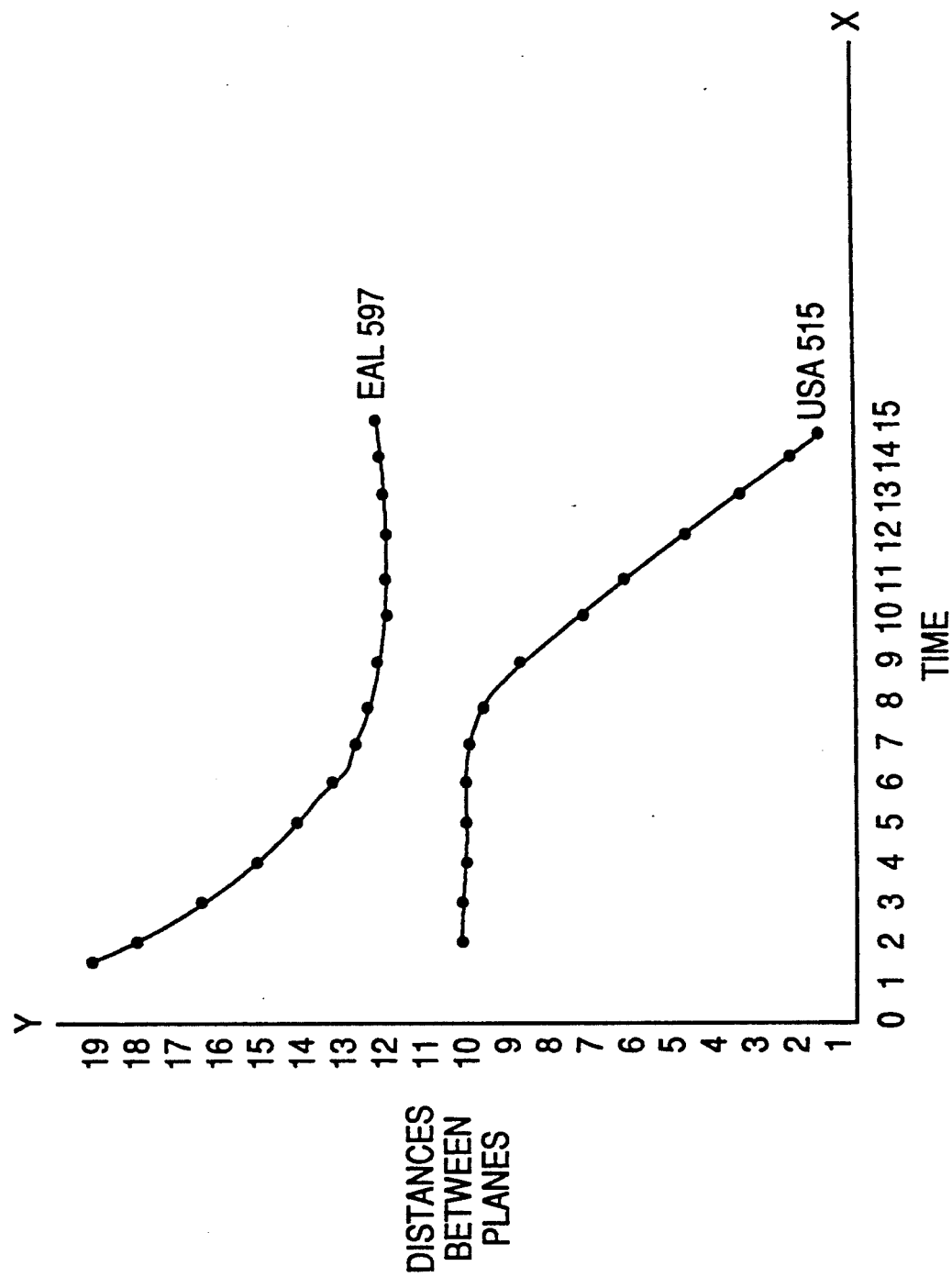

| VOICE DATA | 1400 |
|---|---|
| AIRCRAFT TIME | DIGITIZED COMMUNICATIONS |
| 12:59:23 | PILOT TO CONTROLLER |
| 12:59:25 | CONTROLLER → PILOT |
| 12:59:42 | PILOT → CONTROLLER |
| ⋮ | |

1425 — 12:59:23
1426 — 12:59:25
1420 encompasses the rows

SCENARIO BUILDER PROCEDURE 1500

1510 READ RADAR DATA
1520 READ VOICE DATA
1530 COORDINATE RADAR AND VOICE DATA
1540 TRANSFER CO-ORDINATED DATA TO SIMULATOR

FIG. 16

| TIME | RADAR DATA | | | | | | | VOICE DATA |
|---|---|---|---|---|---|---|---|---|
| | AIRCRAFT ID | TIME | SPEED | X-COORD. | Y-COORD. | F-TIME | | |
| 1661 — 12:59:23 | USA 515 | 12:59:23 | 191 | 14.50 | 1.00 | 10:00 | | PILOT → CONTROLLER |
| 1662 — 12:59:28 | USA 515 | 12:59:28 | 189 | 13.40 | 2.20 | 11:00 | | CONTROLLER → PILOT |
| 1663 — 12:59:33 | USA 515 | 12:59:33 | 187 | 12.80 | 3.20 | 12:00 | | |
| 1664 — 12:59:37 | USA 515 | 12:59:37 | 184 | 11.20 | 5.00 | 13:00 | | PILOT → CONTROLLER |
| 1665 — 12:59:42 | ... | ... | ... | ... | ... | ... | | |

```
1  → READ RADAR DATA
2  → READ VOICE DATA
3  → IF VOICE DATA <> END OF FILE
4     → THEN
5        → WHILE VOICE DATA <> END OF FILE
6           AND RADAR DATA <> END OF FILE
7           → LOOP
8              → IF VOICE DATA TIME < RADAR DATA TIME
9                 → THEN
10                   → CREATE SIMULATED RECORD WITH VOICE DATA
11                   → READ VOICE DATA
12                → ELSE
13                   → IF VOICE DATA TIME = RADAR DATA TIME
14                      → THEN
15                         → CREATE SIMULATED RECORD WITH RADAR DATA
16                              AND WITH VOICE DATA
17                         → READ RADAR DATA
18                         → READ VOICE DATA
19                      → ELSE
20                         → IF VOICE DATA TIME > RADAR DATA TIME
21                            → THEN
22                               → CREATE SIMULATED RECORD WITH
23                                    RADAR DATA
24                               → READ RADAR DATA
25                         → ENDIF
26                   → ENDIF
27                → ENDIF
28           → ENDLOOP
29     → ELSE
30        → WHILE RADAR DATA <> END OF FILE
31           → LOOP
32              → CREATE SIMULATED RECORD WITH RADAR DATA
33              → READ RADAR DATA
34           → ENDLOOP
35  → ENDIF
36  → IF VOICE DATA <> END OF FILE
37     → THEN
38        → WHILE VOICE DATA <> END OF FILE
39           → LOOP
40              → CREATE SIMULATED RECORD WITH VOICE DATA
41              → READ VOICE DATA
42           → ENDLOOP
43     → ELSE
44        → WHILE RADAR DATA <> END OF FILE
45           → LOOP
46              → CREATE SIMULATED RECORD WITH RADAR DATA
47              → READ RADAR DATA
48           → ENDLOOP
49  → ENDIF
```

DIRECT ENTRY AIR TRAFFIC CONTROL SYSTEM FOR ACCIDENT ANALYSIS AND TRAINING

RELATED APPLICATIONS

This application is a continuation-in-part, of U.S. patent application Ser. No. 176,639, now U.S. Pat. No. 4,979,137 filed Apr. 1, 1988, entitled "Air Traffic Control Training System", which is a continuation-in-part of U.S. Pat. Ser. No. 931,867, now U.S. Pat. No. 4,827,418, filed Nov. 18, 1986, entitled "Expert System for Air Traffic Control and Controller Training".

FIELD OF INVENTION

This invention relates to a multisite air traffic control system that simulates air traffic scenarios generated from actual flight information and provides expert analysis of this flight information.

BACKGROUND OF THE INVENTION

At the present time, it requires four or five years to train air traffic controllers. The bulk of this time is spent on the job under the supervision of experienced controllers who are referred to as instructors. The length of time required for on-the-job training is primarily attributed to the limited number of available experienced air traffic controllers at a particular site (airport or en route center) that can spend the proper amount of time to tutor student controllers on a variety of different conditions. The instructors must teach student controllers to be responsible for controlling all aircraft located in their radar sector, which defines a geographic region.

In addition, there are numerous rules and procedures, such as site-specific letters of agreement and standard operating procedures, which student controllers must learn to ensure traffic safety. Consideration must also be given to safe and timely departures and arrivals, fuel economy, and noise pollution.

Student controllers must also learn to monitor dozens of arriving and departing flights under numerous types of traffic and weather conditions. Student controllers must learn to keep track of each aircraft's heading, altitude, and speed, while anticipating each aircraft's future flight path to sequence clearances intelligently and to avoid rule violations and collisions.

In this regard, the current procedures used by both instructors and student controllers to monitor aircraft and to provide clearances intelligently must always be monitored by their colleagues in an effort to insure that all controllers, both instructors and students, are capable of performing their jobs in a quality manner and living up to the standards required by the profession.

In an attempt to reduce the on-the-job training time of air traffic controllers and improve the one-to-one student/instructor ratio, off-the-job training facilities have been established. These facilities are equipped with essentially the same radar equipment as that used by experienced controllers, which requires them to be linked to a main computer at a local airport or en route center. This equipment includes a radar screen which displays the geographical map of that particular site. This map typically consists of a film or slide which has been specially engraved for displaying geographic boundaries of the airport and runways, as well as natural boundaries such as mountains or bodies of water, on the radar screen. Navigational aids such as navigational markers and visual omnirange locations are also commonly displayed by the map. This type of equipment also makes it possible to replay actual radar data recorded during actual aircraft in-flight maneuvers.

One of the problems facing these facilities is that this radar equipment is extremely expensive, so availability is often limited. There is also a temptation to use this training equipment for actual air traffic control when the equipment used by air traffic controllers breaks down. Another concern is that students may be trained on equipment that may soon become obsolete.

Off-the-job practice sessions at these facilities typically include simple air traffic scenarios generated on the student's radar display. These simple scenarios, however, do not provide training for student controllers under many differing conditions. Moreover, aside from their simplicity and although actual radar data may be replayed at these facilities, these scenarios do not provide adequate "real-life" experiences to help train student controllers or to provide adequate practice for more experienced controllers.

The scenarios that are stored in the main computer at a local airport or en route center usually involve complex programs which take into account the particular geographical features of, and site-specific rules and procedures for that airport or en route center. Unfortunately, access to these programs is often interrupted during times when air traffic is heavy because students are directly competing with experienced controllers for computer time.

Another limitation of these facilities is that they are restricted to teaching the students rules for that particular site only. Reasons for limiting training to that particular site include the expense of obtaining a new map and extensive reprogramming of scenarios for that new site. Problems also occur when there are changes in navigational aids for a particular site. In other words, the present training facilities do not have the capacity for training students for different sites or for retraining controllers before they are transferred to new sites. A further disadvantage of existing systems is that during training sessions without an instructor present, students are generally limited by their current knowledge of the numerous rules and procedures.

As a result, independent simulators have been developed to provide student controllers with ample time to learn off-the-job how to perform their required tasks. One example of such a system is disclosed in U.S. Pat. No. 4,949,267 entitled "Site-Selectable Air Traffic Control System" to Gerstenfeld et al.

Typically, the traffic scenarios stored on the main computer at a local airport or en route center, or in the system such as that disclosed in U.S. Pat. No. 4,949,267, allow students to practice giving clearances to aircraft projected on their radar displays by verbally communicating with another person acting as a pseudo pilot. The pseudo pilot in each case responds to the verbal commands or clearances of a student controller by entering the commands into the computer by way of a keyboard. The pseudo pilot then verbally acknowledges the student controller in a manner that is similar to a pilot's response. In complex situations, two pseudopilots may be necessary to respond to the rapid verbal commands of a single student controller. Requiring pseudopilots for the training process has obvious disadvantages including the need to increase the number of individuals present during student training.

The traffic scenarios typically stored in the main computer at an airport or en route center or in any other existing off-the-job training facility are designed to test student controllers and experienced controllers based upon a given level of skill. Thus, experienced controllers are able to practice using more complex scenarios than novices. However, with such systems, even the most experienced controller cannot practice using scenarios generated from "real-life" or actual flight information which would provide for the most realistic scenarios possible in a training system.

Present practice requires that in the event of an accident or "near-miss" (hereinafter referred to as an incident) involving aircraft, radar data corresponding to the flight pattern of an aircraft involved in the incident and voice transmissions of pilot/controller communications must be analyzed by highly trained individuals to determine the cause of the incident. This task of combining communications data with radar data to determine, if possible, the cause of an incident requires tremendous effort.

Recreating events prior to an incident requires, in part, an analysis of the radar data corresponding to the aircraft. In other words, a highly skilled individual must plot, using the radar data, the flight path of the aircraft on a map which depicts the area surrounding the incident. Depending upon the individual circumstances, this analysis alone can take many man hours. To reduce time spent during this portion of accident analysis, the conventional radar systems of air traffic computers may be used to replay the radar data of the aircraft. However, combining the radar data and voice transmissions further complicates this reconstructive process. Additionally, there is no known system which can automatically combine radar data and voice data for purposes of performing incident analysis.

Furthermore, there is no present method of monitoring the radar data and in-flight voice transmissions to determine, in advance, whether an incident is likely to occur in the future and to alert controllers and pilots of the imminent danger. Such a method would require an analysis of all possible future aircraft traffic patterns based upon the aircraft's present flight path, the controller's experience, and a study of the rules and procedures discussed above. This analysis cannot presently be done by controllers or their computer facilities.

It is an object of this invention to generate, using actual flight information, air traffic scenarios for an automated air traffic control simulator which interacts with a user to simulate air traffic scenarios at a selected site (en route or terminal) while providing expert analysis of the scenario to the user.

It is another object of this invention to provide an automated monitor of air traffic at a selected site (en route or terminal) while providing users with expert instruction.

It is still another object of this invention to provide such a system for producing a dynamic simulation of an air traffic scenario based upon actual flight information that can be varied for teaching different procedures at a selected site.

It is a further an object of the present invention to monitor controller/pilot communications and radar data corresponding to the pilot's aircraft to prevent accidents and near-misses.

It is still another object of the present invention to provide a means of analyzing radar data and controller/pilot communications in the event of a near-miss or accident.

It is a further object of this invention to provide a system which operates independently of the actual equipment used by air traffic controllers, thereby making that equipment available full-time for actual air traffic control.

It is still another object of this invention to provide an air traffic control training system that does not require pseudo pilots.

It is yet another object of the present invention to monitor the activities of a controller with respect to each aircraft for which he is responsible, to confirm that the controller is acting in accordance with regulations and to provide expert instruction when necessary.

It is another object of the present invention to provide a playback or rewind feature to aid the user when analyzing scenarios.

It is yet another object of the present invention to provide a means of replaying events, including controller/pilot communications and radar data to provide users during training the ability to try different scenarios and view the outcome of these scenarios.

Additional objectives and advantages of the present invention will be set forth in part in the description which follows and in part will be obvious from that description or ma be learned by practice of the invention. The objectives and advantages of the invention may be realized and obtained by the methods and apparatus particular pointed out in the appended claims.

SUMMARY OF INVENTION

The present invention overcomes the problems of conventional systems and achieves the objectives listed above first by collecting radar data and voice transmissions between controllers located at particular sites and pilots flying aircraft within the controllers monitoring sector and synchronizing this information to develop air traffic scenarios to be used in an air traffic control training system. Second, the present invention results from the realization that a truly effective automated site-selectable system for analyzing clearances provided by air traffic controllers in accord with the rules and procedures for different sites can be achieved by generating realistic air traffic scenarios corresponding to different sites selected by the users, providing controls to change the flight pattern of one or more aircraft, overseeing the actions of the users, and evaluating their actions to automatically instruct and provide feedback to the users in actual air traffic control rules and procedures at that selected site.

Finally, the present invention overcomes the problems of conventional systems and achieves the objectives listed above by providing a simulator that may be connected to an air traffic computer and a voice communications system directly, or that may receive information from the air traffic computer and voice communications system via a data transfer means, i.e., a magnetic tape, to monitor in real time or to analyze the information, i.e., radar data and voice transmissions between controllers and pilots, and to provide expert assistance in real time or expert analysis of the input information. Furthermore the use of voice recognition and digitized voice response eliminates the need for pseudo pilots or can be used in conjunction with pseudo pilots.

To achieve the objects and in accordance with the purpose of this invention, as embodied and broadly described herein, the present invention features an air traffic control simulator in a data processing system capable of being adapted for use corresponding to a plurality of selectable sites, wherein the data processing system includes an input device for receiving input commands from at least one user, a display apparatus having a display screen to display at least one of a plurality of states of simulated air traffic scenarios, a general knowledge base for storing common rules, procedures, general techniques, and emergency procedures applicable to the air traffic scenario simulations for the plurality of selectable sites, and a site-specific knowledge base for storing particular rules, procedures, site specific techniques, and local emergency procedures applicable to at least one of the plurality of selectable sites, and wherein the simulator may interact with the user to simulate an air traffic scenario from radar data corresponding to at least one aircraft and identifying at least one position and heading of the aircraft, and voice data corresponding to communications with a pilot of the aircraft. The simulator comprises a radar input means for receiving the radar data, a voice input means for receiving the voice data, a coordinating means for coordinating the input radar data and the input voice data to generate coordinated data for producing one of the air traffic scenarios, a selector means, responsive to input commands from the user, for selecting the position and heading of the aircraft to initialize the air traffic scenario in accordance with one of the plurality of selectable sites, and a generating means for generating on the display screen the produced air traffic scenario including a representation of the aircraft indicating the selected position and heading.

BRIEF DESCRIPTION OF DRAWINGS

The accompanying drawings which are incorporated in and which constitute a part of this specification, illustrate an embodiment of the invention and, together with the description, explain the principles of the invention.

FIG. 13 illustrates an example of the radar data of FIG. 2;

FIG. 13A illustrates a graphic representative of the example of radar data in FIG. 13;

FIG. 16 illustrates an example of the scenario data generated from the radar data of FIG. 13 and the voice data of FIG. 14;

FIG. 17 is an example of pseudo code which represents an implementation of the scenario builder of FIG. 2.

DESCRIPTION OF A PREFERRED IMPLEMENTATION

Reference will now be made in detail to the preferred embodiment of the invention as illustrated in the accompanying drawings.

The invention can be accomplished by providing a site selectable air traffic control system which allows a user to interact with a simulator to change or alter air traffic scenarios at a selected site while providing feedback that would normally be provided by experienced controllers. While the description of the system refers to a simulator for teaching a student, the utility of the simulator extends beyond the classroom. For instance, the simulator is equally applicable for testing new plans and procedures at a specific site for improving air traffic control. Such tests may include a redistribution of the work load of air traffic controllers, changes in airways or navigational markers, or redistribution of arrival and departure routes. Furthermore, as described below, the simulator may be used to monitor air traffic in real time and to provide expert assistance to analyze data corresponding to air traffic previously monitored by controllers.

Figure 18:
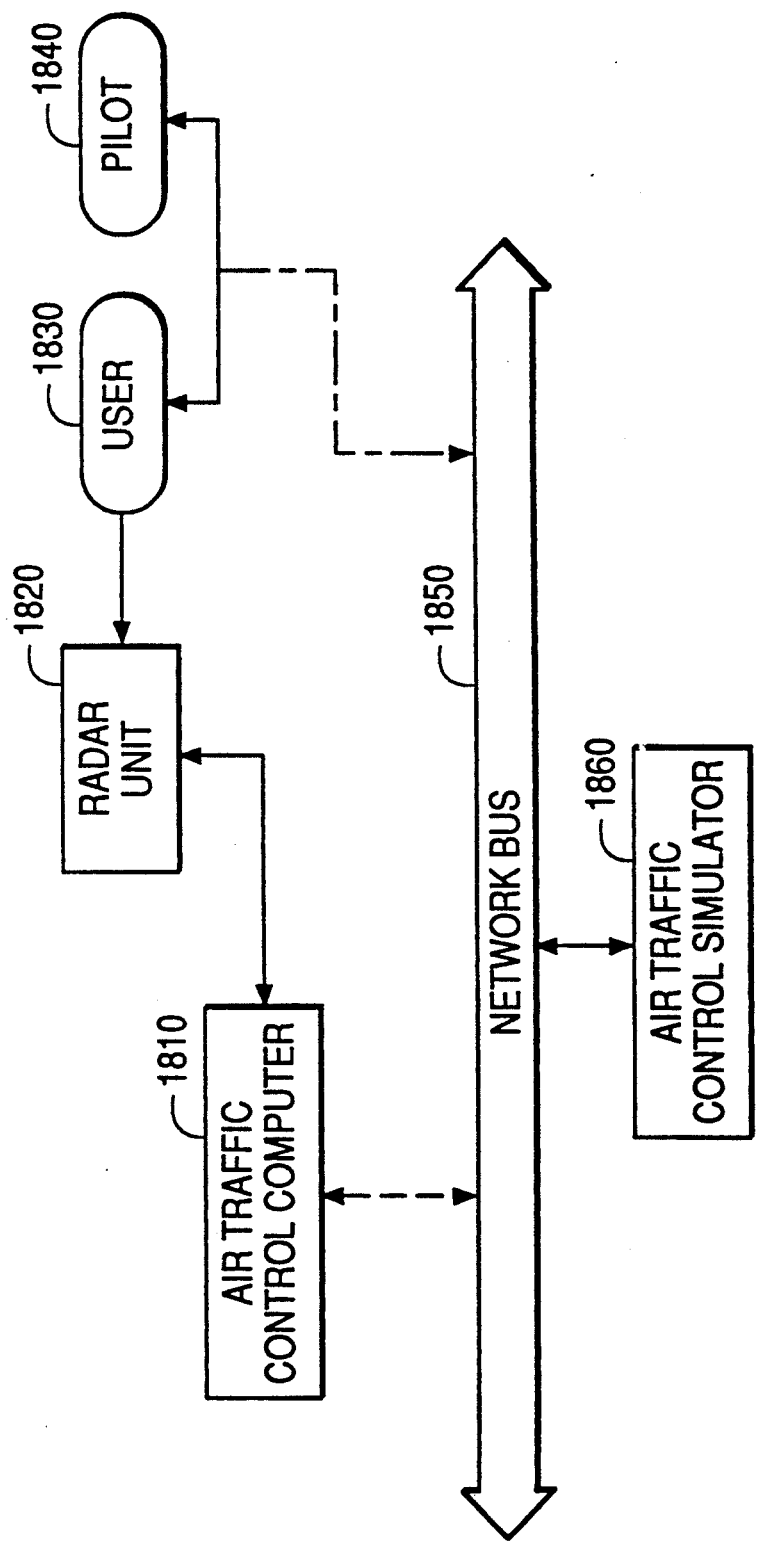
FIG. 18 is a block diagram of an implementation of the present invention.

FIG. 18 illustrates an implementation of the present invention. In FIG. 18 an air traffic control computer 1810 is connected to a radar unit 1820, which is monitored by an air traffic controller (also called a user) 1830. The air traffic controller 1830 communicates with a pilot 1840 of a particular aircraft in a selected site, and these communications or voice data (if any) are transferred, in real time or via a storage device, through a network bus 1850 to an air traffic control simulator 1860. At the same time, radar data generated by the air traffic control computer 1810 is transferred via the network bus 1850 to the air traffic control simulator 1860. In this manner, the air traffic control simulator 1860 receives actual flight information corresponding to voice data (if any and radar data of real aircraft maneuvers. The composition and protocol of the bus 1850 is not important as long as it allows for communication of the information between the air traffic control computer 1810 and the communications between controller 1830, the pilot 1840 and the air traffic control simulator 1860.

Figure 1:
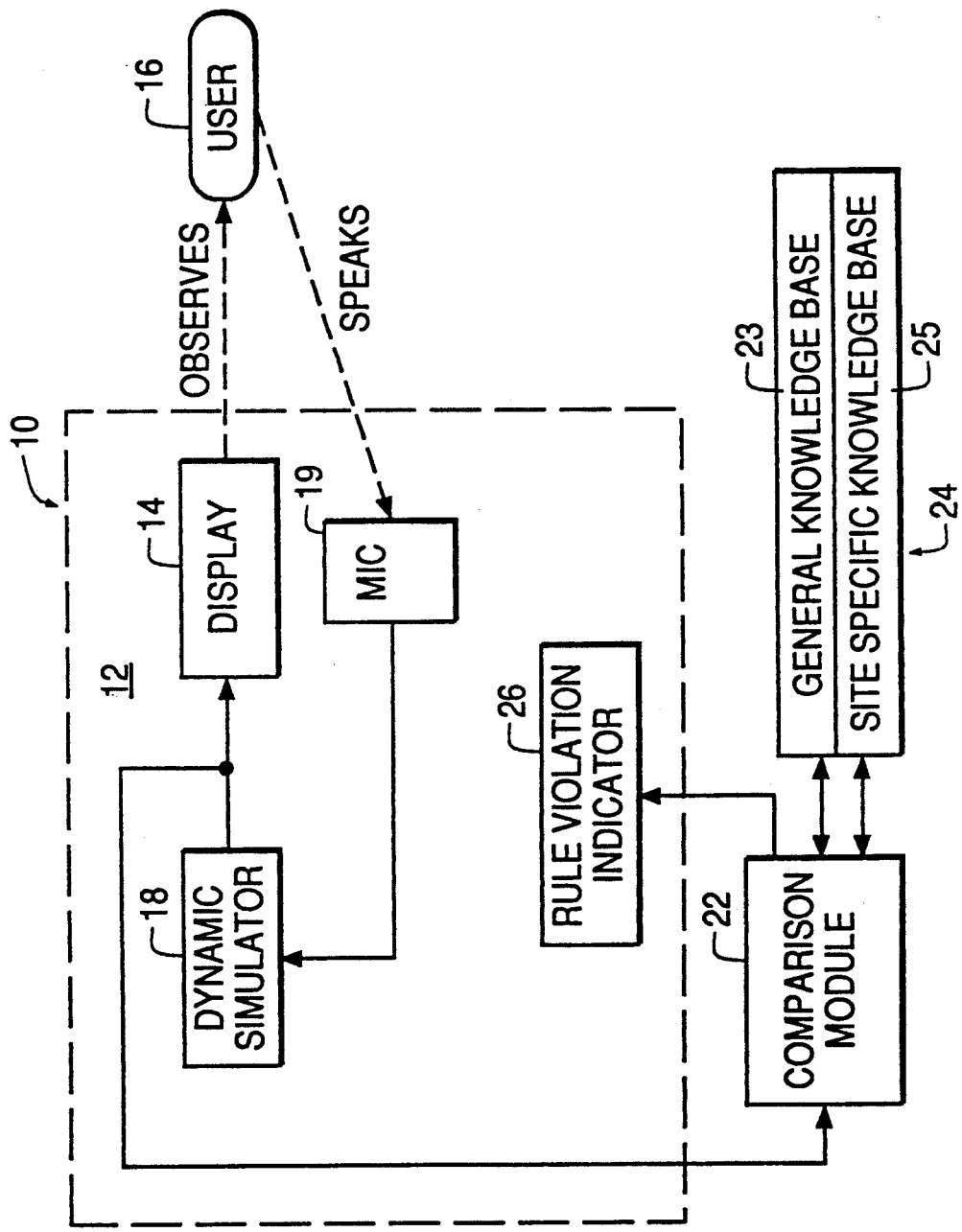
FIG. 1 is a schematic block diagram of a system according to this invention having a unit which accesses a knowledge base consisting of a general knowledge base and a site-specific knowledge base.

As shown in FIG. 1 a simulator 10 is the same as the simulator 1860 in FIG. 18. The simulator 10 includes unit 12 having a display 14 on which a user 16 may observe an air traffic scenario that is generated for a particular site by a dynamic simulator 18. The dynamic simulator 18 includes a voice recognition apparatus 19 for receiving voice transmissions from the user 16. As the scenario develops, user 16 issues verbal commands to be processed by the dynamic simulator 18 and to alter the scenario according to the user's command. A comparison module 22 constantly monitors the information generated by dynamic simulator 18 for comparing the present state of the scenario to determine if a rule or procedure, stored in a knowledge base 24, is violated or if the user 16 demonstrates poor technique.

Figure 1A:
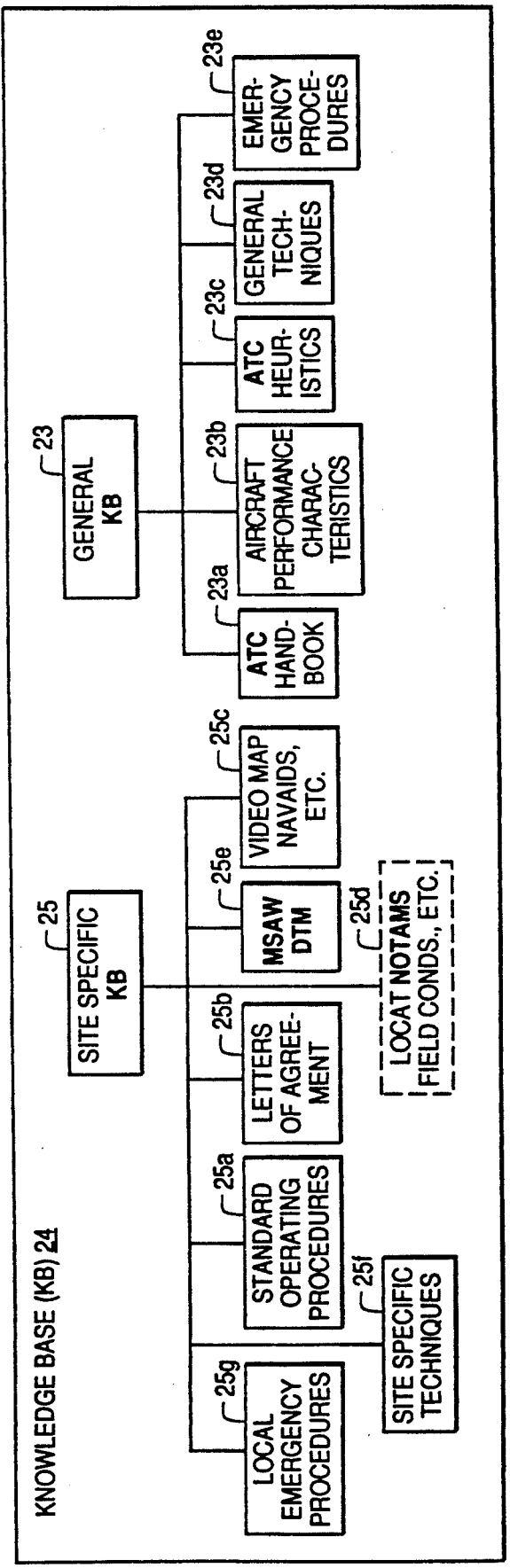
FIG. 1A is a schematic block diagram of the knowledge bases of FIG. 1 including rules, procedures, and techniques stored in the general knowledge base and the site-specific knowledge base.

Knowledge base 24, as shown in FIG. 1A, consists of a general knowledge base 23 and a site-specific knowledge base 25. General knowledge base 23 includes general rules and procedures that are applicable to air traffic scenarios for a plurality of sites, and may include Air Traffic Control Handbook rules 23a, Dynamic Aircraft Performance Characteristics 23b, air traffic control heuristics which include expert techniques 23c, general techniques 23d, and emergency procedures 23e applicable for each scenario. Other general rules and procedures regarding sequencing and safety may also be included.

Site-specific knowledge base 25 includes rules and procedures for each of the selected sites, and may include standard operating procedures (SOPs) 25a, site-specific letters of agreement 25b (LOAs), navigational aids (NAVAIDs) 25c, notices to airmen (NOTAMs) 25d, minimum safe altitude warnings (MSAW) 25e, site specific techniques 25f, and local emergency procedures 25g. NAVAIDS 25c typically include rules and procedures for instrument landing. Such rules and procedures are associated with navigational markers, such as intersections of visual omniranges, glide paths, or localizers and geographical boundaries and features particular to that site. NOTAMS 25d is transient information which requires frequent updating. For this reason, NOTAMS 25d is indicated in FIG. 1A by a dotted line box. NOTAMS 25d include notices such as the present condition of each runway, as well as other pertinent notices, such as a plane having a flat tire on a particular runway.

If a rule or procedure is violated, comparison module 22 (FIG. 1) issues a warning to a rule violation indicator 26, which informs user 16 that a rule or procedure has been violated or if the user 16 demonstrates poor technique. If poor technique is demonstrated by the user 16, then comparison module 22 issues advice via rule violation indicator 26. In rule violation indicator 26 indicates a warning of a rule or procedure violation or that the user 16 has demonstrated poor technique by generating a message to be output on the display 14 or via an optional voice synthesizer (not shown) which is capable of outputting a voice message to the user. For example, if separation is too great between aircraft a rule or procedure will not be violated but time and fuel may be wasted. Comparison module 22 would compare the user's 16 control parameters with heuristic techniques and other general and site-specific techniques for notifying the user of possible improvements.

As another example, a recommendation could be made to improve the user's 16 clearance commands to provide a smooth ride for passengers, i.e., avoid unnecessary speed changes, altitude changes, or heading changes. Thus, the unit 12 allows a user to compare his technique with that of an expert or the technique used by a controller who actually controlled the subject aircraft. This process is accomplished by storing either the approach taken by an expert or experienced controller for that given scenario and comparing that approach to that of the user. Comparison module 22 is used to determine if there is a large variation from the expert's approach for that site.

Figure 2:
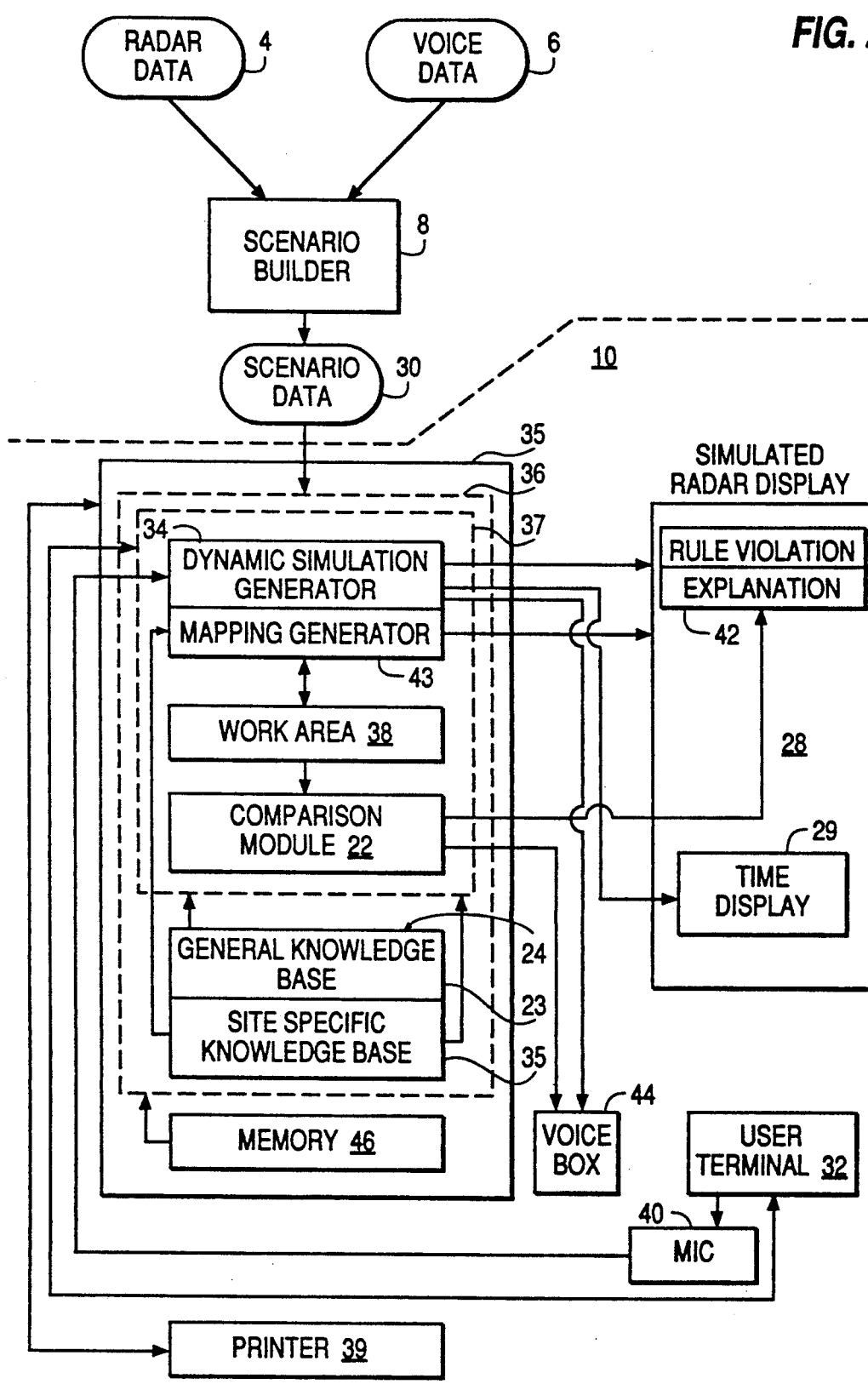
FIG. 2 is a schematic block diagram of the hardware components of the system according to this invention.

As illustrated in FIG. 2, the scenario builder 8 receives radar data 4 and voice data 6 (if any) and generates scenario data 30. In the preferred implementation, the scenario builder 8 receives voice data 6, however, other implementations may not require the voice data 6. Additionally, although in the preferred implementation, the scenario data 30 is processed radar and voice data (if any), scenario data 30 may include data which has not been processed by the scenario builder 8.

The simulator 10 receives scenario data 30 which has been processed by the scenario builder 8 (discussed below). A simulated radar display 28 simulates the generated scenario for a particular site. The radar data 4 and the voice data 6 may be provided from any external type storage device or in "real time" directly from an air traffic control computer. Display 28 may be generated using a standard piece of hardware having high-resolution graphics, such as an Apollo AI or a DEC MICROVAX AI workstation.

Figure 7:
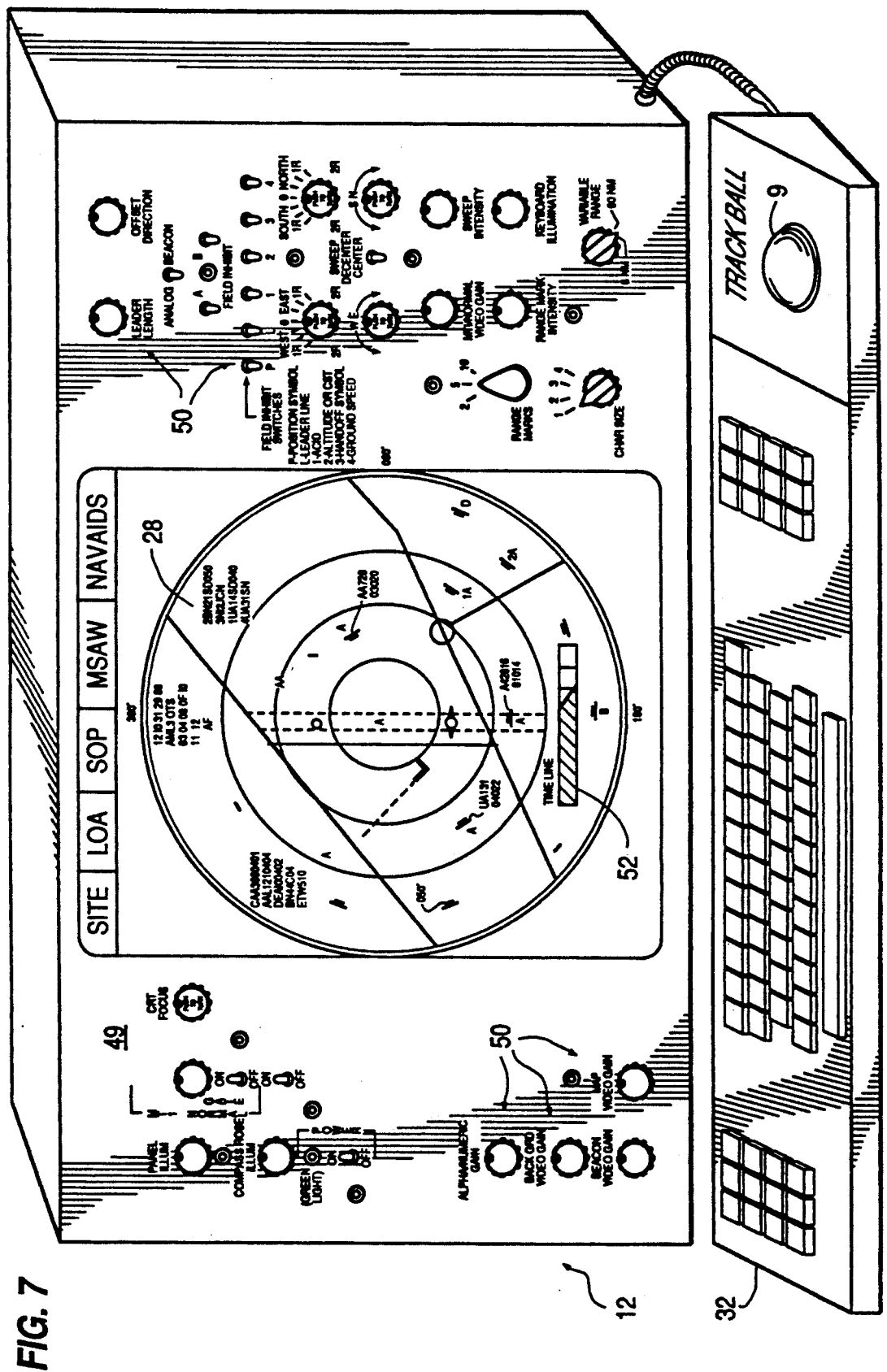
FIG. 7 is a front perspective view of the unit showing a control panel and instrumentation.

An air traffic control scenario is selected from the scenario data 30 on a user terminal 32 placed in front of the simulated radar display 28. Terminal 32 may be connected to a track ball 9, as shown in FIG. 7, which is used for controlling a cursor, not shown. Preferably pop-up screens or windows are used to list the selections for making a decision. Data 30 may include information for a variety of training scenarios that are scaled for beginners to experts. Scenarios may include circumstances that occur rarely. The advantage of providing these types of scenarios is that the user can be trained to handle a variety of complex situations that may not otherwise occur during his on-the-job training. These scenarios may also provide practice for experienced controllers for sharpening their skills.

Figures 14, 15:
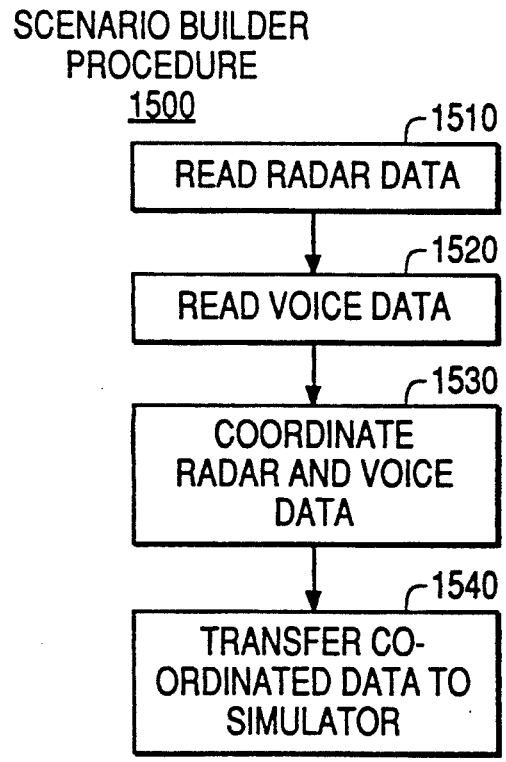
FIG. 14 illustrates an example of the voice data of FIG. 2.
FIG. 15 is a flow diagram of an implementation of the scenario builder of FIG. 2 used to generate scenario data from radar data of FIG. 13 and voice data of FIG. 14.

The information for scenarios in scenario data 30 preferably includes flight information or data representative of actual flight patterns of aircraft at selected sites along with corresponding communications between a pilot of each aircraft and a controller. The actual flight patterns of aircraft, an example of which is depicted in FIG. 14 showing two aircraft, is developed from the radar data generated by an air traffic computer. The communications between a pilot and a controller is developed from the communications system used by controllers at selected sites or the system used by pilots on the aircraft represented by the radar data.

Figure 12:
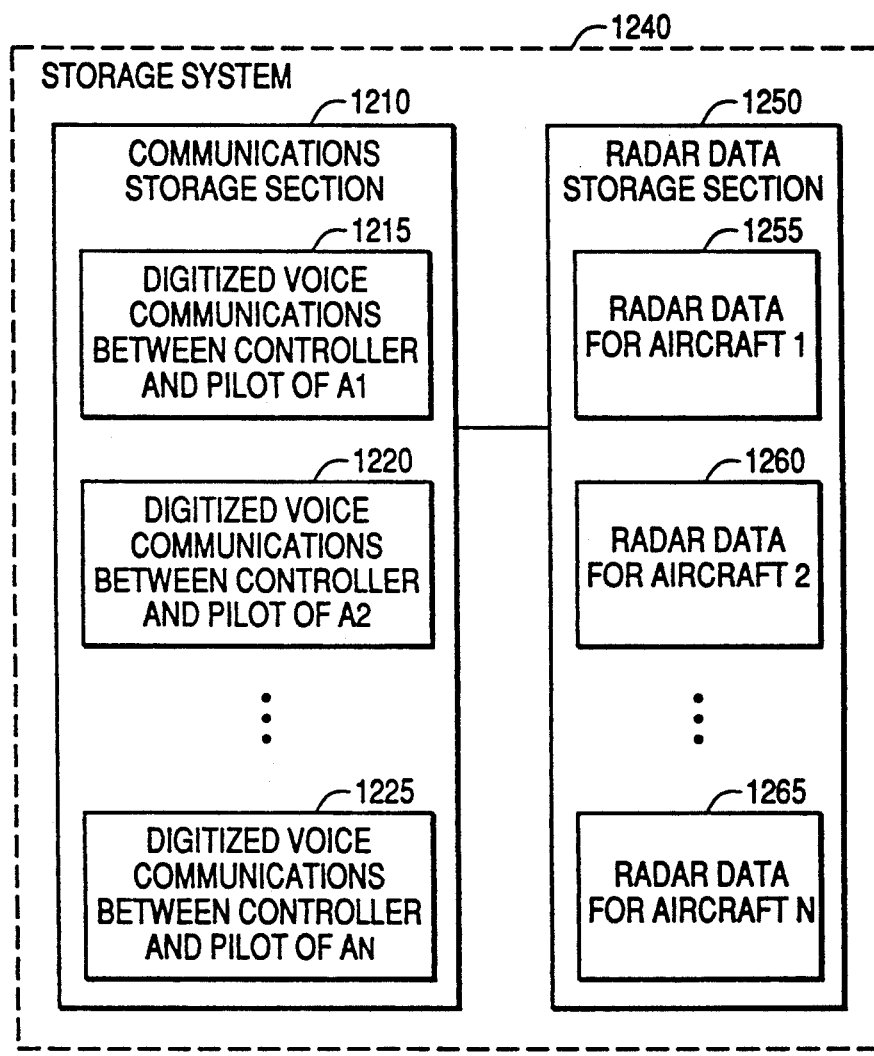
FIG. 12 is a block diagram of a storage system for the radar data and the voice data of FIG. 2.

As shown in FIG. 12, the radar data 4 (FIG. 2) and voice data 6 (FIG. 2) is stored in a data storage 1240 which includes a communications storage section 1210 and a radar data storage section 1250. The communications storage section 1210 includes the digitized voice communications between pilots of aircraft within a selected site and a controller responsible for monitoring those aircraft. For example, communications storage section 1210 includes the digitized voice communications between a controller and a pilot of aircraft A1 1215, the digitized voice communications between a controller and the pilot of aircraft A2 1220, and the digitized voice communications between a controller and the pilot of aircraft AN 1225. Each of the digitized voice communications between a controller and a pilot 1215–1225 corresponds to a particular air traffic scenario to be generated by the scenario builder 8.

The radar data storage section 1250 preferably includes radar data for aircraft A1 1255, radar data for aircraft A2 1260, and radar data for aircraft AN 1265. Each of the radar data 1255–1265 corresponds to one of the digitized voice communications between a controller and the pilot of each of the respective aircraft 1215–1225. In this manner, radar data and corresponding digitized voice communications or voice data for a particular aircraft within a selected site may be combined to generate air traffic scenarios.

FIG. 13 depicts a format of radar data associated with, for example, aircraft A1 1255 (here called USA 515) and aircraft AN 1265 (here called EAL 597). This radar data preferably includes entries 1310, each of which contains fields which represent radar information, such as the headings, X-COORDINATE and Y-COORDINATE, and SPEED corresponding to a specific aircraft having an AIRCRAFT ID, such as USA 515, at different time intervals indicated in the TIME entry. Each entry also includes a field containing the flight time for the aircraft. The flight time is monitored by controllers to assess the current fuel capacity of an aircraft during a flight.

Figure 3:
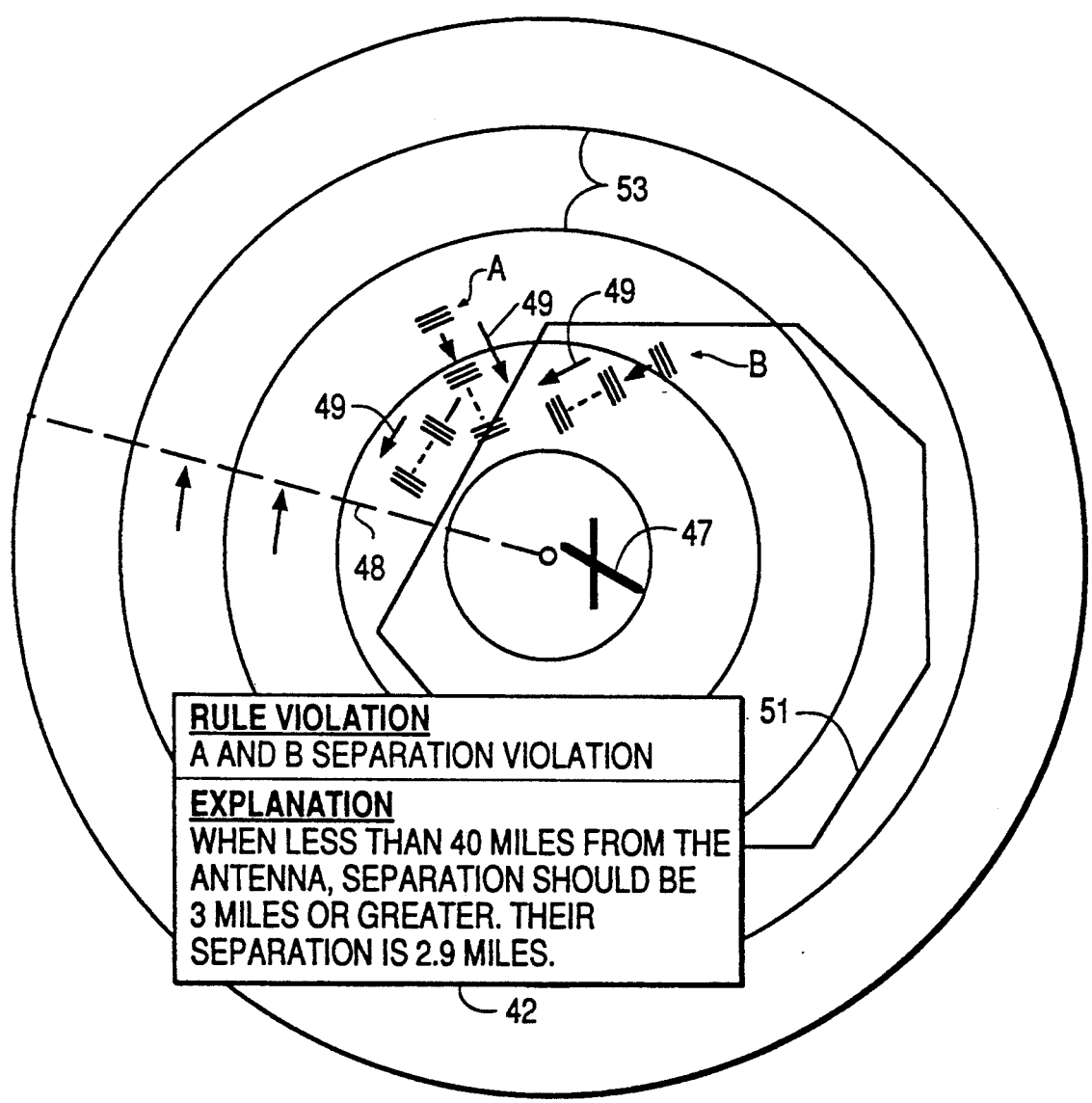
FIG. 3 is an illustration of a radar screen showing the flight pattern of two aircraft at a particular airport terminal.

The entries in the radar data storage section 1250 corresponding to each aircraft, as depicted in FIG. 13, can be better understood with reference to FIG. 13A which identifies the two aircraft USA 515 and EAL 597 and the location of those aircraft on a map corresponding to a portion of a controllers radar screen surrounding a site, for example Logan International Airport (such as the screen shown in FIG. 3).

FIG. 13A depicts two aircraft on a radar screen. A first aircraft is USA 515 of FIG. 13 and a second aircraft is EAL 597 of FIG. 13. In FIG. 13A, USA 515 approaches an airport runway (not shown) by decreasing speed and EAL 597 departs from the airport runway (not shown) by increasing speed. At time x=8, the two aircraft are within 0.8 nautical miles of each other which constitutes a "near miss." When this occurs, the rule violation indicator 26 will issue a warning to the user 16. It is this type of incident that may be analyzed using the system of the present invention.

FIG. 14 depicts a format of the voice data stored in the communications storage portion 1210 of the storage 1240 (FIG. 12) representative of the digitized voice communications between a controller and a pilot of an aircraft. For example, the voice data of FIG. 14 preferably includes entries 1420 which identify the aircraft time or the time when a communication between the controller and the pilot took place. Each entry also includes data, capable of being used to generate digitized communications output simulating actual conversations between the pilot and controller. In entry 1425, at time 12:59:23, the pilot communicated with the controller, however, at time 12:59:25, entry 1426, the controller communicated with the pilot. These entries are used by the scenario builder 8 of FIG. 2 to build scenarios.

FIG. 15 is a flow diagram 1500 of the steps performed by the preferred implementation of scenario builder 8 (FIG. 2) to develop the air traffic scenarios or scenario data 30 from radar data 4 and voice data 6 of FIG. 2. First, aircraft radar data from an air traffic computer, such as data 1215, in real time, or from a storage device, i.e., a magnetic tape, storing the data is input to the scenario builder 8 shown in FIG. 2 (step 1510). Next, the scenario builder 8 reads voice communications (if any) between a controller and the pilot for a particular aircraft, such as data 1255, corresponding to the input aircraft radar data (step 1520). After both the aircraft radar data and communications information have been input to the scenario builder 8, the scenario builder 8 coordinates the radar data with the digitized communications (step 1530). This coordination may also be described as synchronizing the read-in radar data entries and actual communications to produce scenario data for the simulator. After the read-in radar data and communications have been coordinated to create an air traffic scenario in real time, the scenario data for the scenario is transferred to the simulator for processing by the expert system 36 (step 1540).

The scenario data 1650 of FIG. 16 depicts the result or output from the scenario builder 8 (FIG. 2). The scenario data 1650 includes simulated record entries 1660. Each of the simulated record entries contains a time, radar data field, and a voice data field. The radar data field contains all of the information included in, for example, the radar entries 1310 of FIG. 13. The voice data fields contains the communications information included in, for example, the voice entries 1420 of FIG. 14. Finally, the time field corresponds to the time of either the radar data entry in the radar field or the time associated with the voice data entry contained in the voice field of the scenario data entry. This is the result of the processes of the scenario builder 8, which, when the time of the radar data entry is the same as the time of the voice data entry, generates a simulated record of scenario data including information in both a radar data field and a voice data field. Otherwise, the scenario builder generates scenario data entry with information in either the radar field o the voice field.

Looking at FIG. 16, the first entry 1661 of the entries 1660 includes a time, 12:59:23, information in the radar field, which corresponds to the radar data entry 1312 of FIG. 13, and information in the voice field which corresponds to the voice data entry 1425 of FIG. 14. The same is true for the second entry 1562 which corresponds to radar data entry 1314 and voice data entry 1426.

Note that the time of the voice data entry 1326 is 12:59:25 and the time of the radar data entry 1414 is 12:59:28. Because these times were considered by the scenario builder 8, using a predetermined delta factor (e.g., 3 seconds), to have occurred at the same time, the scenario builder 8 generated the entry 1662 using a radar data entry and a voice data entry having slightly different times.

The third entry 1663 is also the third possible type of entry, which is an entry containing only information in the radar field. This information in the radar field corresponds to the entry 1316 (FIG. 13). However, since the scenario builder 8 did not, using the predetermined delta factor, find a voice data having the same time, this third entry does not contain any voice data information in the voice field. The same is true for the fourth entry 1664 depicted in FIG. 16A.

Finally, the fifth entry 1665 depicts the last possible type of simulated record or entry in the scenario data 1650. In this entry, there is no radar data information in the radar field. This entry only has a time and voice data information in the voice field. During the processing of the scenario builder 8, no radar data entry with a time equal (using the predetermined delta factor) to the time of the voice data in the voice field of this scenario data was found.

Thus, there are three types of scenario data entries. Those that only contain a time and information in the radar field, those that contain a time and information in the voice field, and those that contain a time and information in both the radar and voice field. However, the third type of entry may contain radar information and voice information having slightly different times identified in the radar data and voice data of FIG. 12 depending on the selected delta factor.

The coordinating step 1530 (FIG. 15) can be better understood through the pseudo code 1700 of FIG. 17 which represents an implementation of the scenario builder 8 of FIG. 2 and includes the coordinating step 1530.

The Endif and Endloop notations in this pseudo code signify the end of an "if-then" or "if-then-else" condition or the end of a loop. These types of notations are conventional and will not be explained further. It is also conventional to indent pseudo code as shown above. The indentation of each of the lines which signify the beginning of a condition statement ("if-then" or "if-then-else" statement) or of a loop ("While [...]Loop") matches the indentation of the line signifying the end of the steps performed in response to a true and/or false determination of the condition statement or during the loop. For example, the "Loop" on line 7 which signifies the beginning of a loop is indented 21 spaces and the "Endloop" on line 28 which signifies the end of the loop beginning on line 7 is also indented 21 spaces.

In lines 1 and 2, the scenario builder 8 attempts to read one entry of radar data, for example entry 1312 of FIG. 13, and one entry of voice data, for example entry 1425 of FIG. 14, from storage 1240 (FIG. 12). If there is no radar data then an end-of-file or "EOF" flag is set for the radar data and the scenario builder 8 adjusts the processing accordingly. Likewise if there is no voice data then and EOF flag is set for the voice data and the scenario builder 8 adjusts the processing accordingly. In practice, it is very unlikely that there will be no radar data to be processed, however, it is possible that there will be no voice data to be processed by the scenario builder 8.

After attempting to read an entry of radar data and voice data (lines 1-2), the scenario builder 8 determines whether there a voice data entry was input in line 2, i.e., whether the EOF flag was not set for the voice data (line 3). If true, then (line 4) the scenario builder 8 enters a loop (lines 5-28).

In the loop (lines 5-28), until either the voice data EOF flag is set or the radar data EOF flag is set, the scenario builder 8 merges the entries of the radar data and the entries of the voice data based upon the time of each of the entries in the radar data and the voice data. First, the scenario builder 8 determines whether the time of the voice data entry read in line 2 is less than the time of the radar data entry read in line 1 (line 8). If this is true then the scenario builder 8 (line 9), creates a simulated record of scenario data containing the input voice data entry (line 10) and attempts to read the next voice data entry (line 11). Otherwise (line 12), the answer to the determination in line 8 is false and the scenario builder 8 determines whether the time of the input voice data entry is the same as the time of the radar data entry (line 13). If true (line 14), then the scenario builder 8 creates a simulated record of scenario data containing both the input radar data entry and the input voice data entry (lines 15-16), and then attempts to read the next radar data entry and the next voice data entry (lines 17-18).

Because of the differences in the recording systems used to record radar data and voice data, the time of the voice data entries and the radar data entries may not coincide exactly. Therefore when the scenario builder 8 checks to see if the time of the voice data entry is the same as the time of the radar data entry (line 13), the scenario builder 8 may take into account a predetermined delta factor, for example, 3 seconds. Thus, if the time of a radar data entry is within three seconds of the time of a voice data entry, then the scenario builder 8 would consider the these voice and radar entries to have the same time.

Otherwise (line 19), if the time of the voice data entry is not less than the time of the radar data entry and the time of the voice data entry is not equal to the time of the radar data entry, then the time of the voice data entry is greater than the time of the radar data entry (line 20). If this is true, then (line 21) the scenario builder 8 creates a simulated record of scenario data with the input radar data (lines 22-23) and then attempts to read the next radar data entry (line 24).

As stated, all of the above steps of the loop (lines 5-28) are repeated until either the voice data EOF flag is set or the radar data EOF flag is set.

If, after the initial attempt to read the voice data (line 2), the determination in line 3 is (false) that the EOF flag for the voice data is set, then (line 29) the processing performed by scenario builder 8 enters a different loop (lines 30-34). When entering this loop (line 30-34), there is no voice data to be input to the scenario builder 8 and the scenario builder 8 only processes input radar data. In line 32, the scenario builder 8 creates a simulated record of scenario data using the input radar data entry. Then, in line 33, an attempt is made to read the next radar data entry. As stated, these lines (30-34) are performed until there are no more radar data entries to be input (or the EOF flag for the radar data is set).

After the scenario builder 8 either processes all of either the input radar data entries or the input voice data entries (lines 5-28) or all of the input radar data entries alone (lines 30-34) if there are no input voice data entries, the scenario builder 8 determines whether the EOF flag for the voice data is set (line 36). This would be true if, during the loop (line 5-28), the scenario builder 8 attempted to read a voice data entry and there were no more entries to be read. If the EOF flag for the voice data is not set (line 36), then (line 37) the scenario builder completed the loop (lines 5-28) without processing all of the voice data entries. In this case, the processing performed by scenario builder 8 enters another loop (lines 38-42) where a voice data entry left over from the processing of the loop (lines 5-28) is used to create a simulated record of scenario data (line 40) and the scenario builder 8 attempts to read the next voice data entry (line 41). If the EOF flag for the voice data is not set, then the loop containing lines 40 and 41 is performed until the EOF flag for the voice data is set.

Otherwise, the scenario builder 8 finished the processing of the loop (lines 5-28) without having set the EOF flag of the radar data (line 43). In this case, the scenario builder 8 enters a different loop (lines 44-48) where a radar data entry left over from the loop (lines 5-28) is used to create a simulated record of scenario data (line 46) and the scenario builder 8 attempts to read the next radar data entry (line 47). Lines 46 and 47 are performed until there are no more radar data entries to be input.

At this point, when all of the input radar data entries and the input voice data entries have been merged together into simulated records for scenario data, the processing of scenario builder 8, as explained using an implementation in pseudo code is complete. Other implementations of the scenario builder 8, such as a synchronization procedure using a system clock and the time stamped input data, where the system clock maintains the timing of the input radar data entries and the input voice data entries will be obvious to one of ordinary skill in the art.

Once an air traffic scenario is selected and scenario data 30 is generated by the scenario builder 8, the scenario data 30, for example scenario data 1650 of FIG. 16 is fed into an expert system 36 of a CPU 35 (FIG. 2). Expert system 36 includes an inference engine 37 and a knowledge base 24. Inference engine 37 consists of a dynamic simulation generator 34 for generating the scenario from the scenario data 1650 on the simulated radar display 28 and a mapping generator 43 for generating the geographical boundaries and features for a selected site. These boundaries and features are preferably stored in site-specific knowledge base 35. A work area 38 which is used to update the scenario shown on display 28. Work area 38, comparison module 22, dynamic simulator generate 34, and mapping generator 43 are illustrated as the dynamic simulator 18 of FIG. 1. Comparison module 22, within inference engine 37, calculates the present heading, speed, altitude, etc., for each aircraft before displaying the updated version on display screen 28. The knowledge base 24 is accessed by comparison module 22 in real time or faster than real time as needed.

As the scenario develops, the user may either observe the expert analysis of the scenario or may react to aircraft shown on display screen 28 by issuing clearance commands for changing the flight pattern of a particular aircraft. These commands are verbally issued over a microphone assembly 40, which assembly consists of a voice recognition system which translates the voice of the user into digitized voice signal which informs dynamic simulation generator 34 of the changes to update the parameters of the scenario in work area 38. Dynamic simulation generator 34 then acknowledges these changes back to user 16 over voice box 44 for simulating using digitized voice signals a typical response from an aircraft pilot.

When work area 38 is updated either by the scenario data from the scenario builder 8 or the user input, comparison module 22 compares the present state of the scenario with knowledge base 24 to determine if a rule or procedure is violated or if poor technique is demonstrated. If a violation occurs, comparison module 22 issues a warning to user 16 by generating an instructor's window 42 on simulated radar display 28. The instructor's window 42 consists of an inset on the display which includes an alert message that a rule or procedure is violated and an explanation of the violation. The explanation may include the text of the rule or procedure that was violated, refer to a specific rule, or make recommended courses of action. Alternatively, the comparison module may issue, in conjunction with the instructor's window, a warning over a voice box 44 which essentially reads the contents displayed in the instructor's window. This allows the user to continually focus his attention on the developing air traffic scenario In the preferred implementation, the entire session is recorded in a memory 46. Clearances issued by the user and warnings issued by comparison module 22 are recorded as they occur. This allows a user or an instructor to later review the session on simulated radar display 28 or on a hard copy provided by a printer 39.

As a simple illustration, an air traffic scenario for a particular site is shown in FIG. 3. The simulation includes a radar sweep 48 that tracks two aircraft A and B located in different geographical regions of the controller's sector as it passes over that region. Geographical boundaries 51 and navigational marks 53 are also shown. The flight pattern of each aircraft is dynamically controlled by the operator. In other words, once the aircraft becomes visible on the simulated radar screen, it is up to user 16 to control its flight pattern in order to safely land that aircraft on runway 47.

Whenever the radar sweep tracks an aircraft, the aircraft's heading and position is updated according to its previous flight pattern or by a recent user clearance command. If the user does nothing, the airplane will continue on its original path as indicated by arrows 49. By issuing a clearance command, the course of the aircraft is changed. This new course for this aircraft will continue at the same heading, speed, altitude, etc., as instructed by the user until such time as another clearance command is issued. As the scenario is updated, comparison module 22 compares the data for the present state of the scenario with the rules, procedures, and a record of the performance of an expert air traffic controller for that air traffic scenario in knowledge base 24 for possible violations.

In the preferred implementation, the alert is a short message that tells the controller that something is wrong, i.e., there is wake turbulence, noise abatement, separation violation, etc. The explanation includes a message that explains why there was a violation by citing the particular rule violated. For this case, expert system 22 generates a warning in instructor's window 42 alerting the user that aircraft A and B violated a separation rule, and cites the rule.

Figure 4:
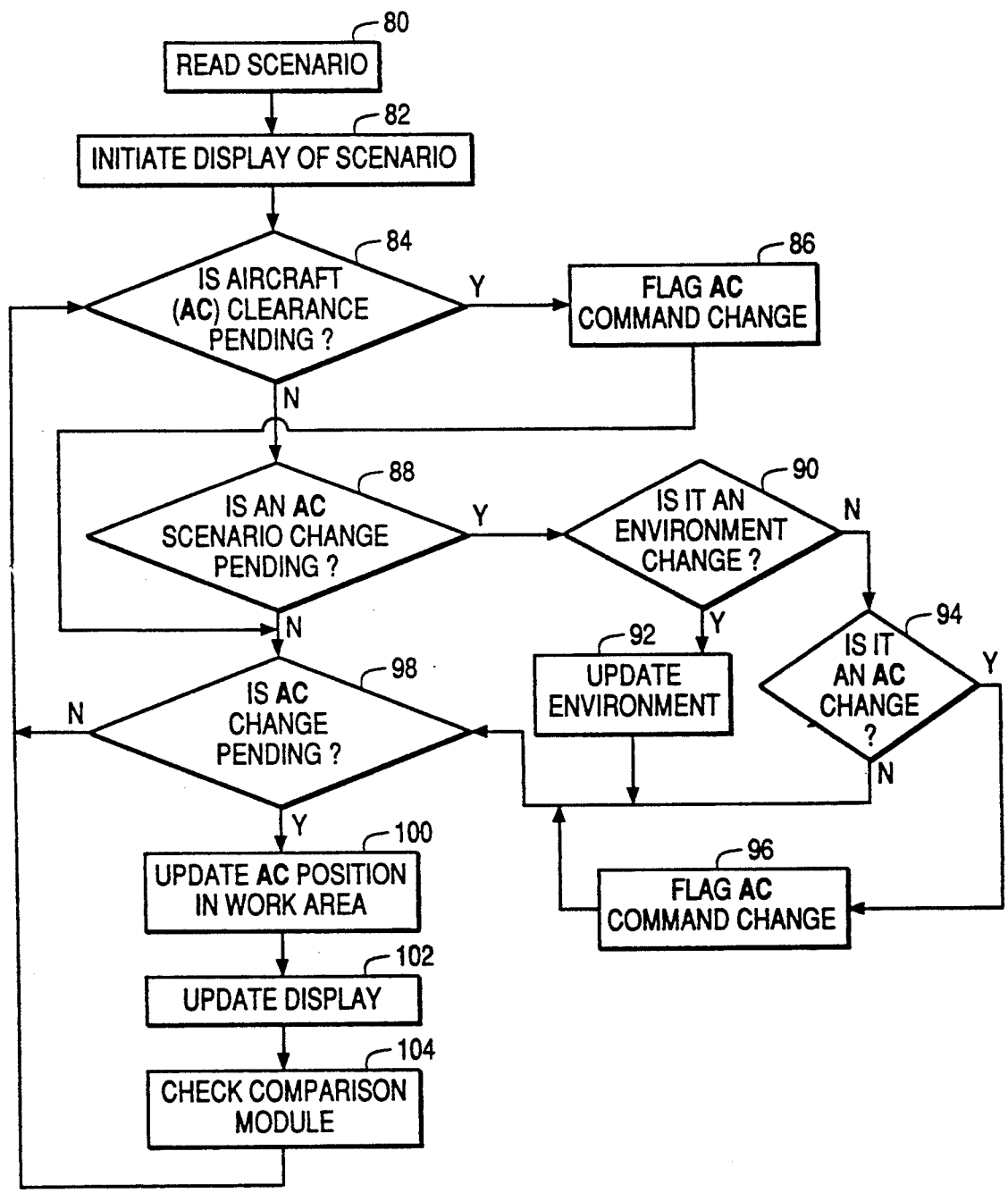
FIG. 4 is a flow diagram illustrating an implementation of the simulation generator shown in FIG. 2.

The operation of dynamic simulation generator 34 is illustrated in FIG. 4. After user 16 has chosen a scenario from the scenario data 30, the selected scenario data is loaded into the scenario builder 8 for processing in accordance with the steps of FIG. 15 and then, the processed scenario is loaded into the dynamic simulation generator 34, step 80, which processes the stored information and initiates the scenario on the simulated radar display screen, step 82. The simulation generator then determines whether a controller clearance is pending for an aircraft tracked by the radar sweep, step 84. If a command is pending, then generator 34 translates the command into an aircraft change instruction, step 86, which updates the position of the aircraft in the work area, step 100, and simultaneously updates the display, step 102. This update is then checked by comparison module 22 for possible violations before returning to see if another control clearance is pending, step 104.

For cases where there are no controller clearances pending, simulation generator 34 checks to see if there is a scenario change, step 88. If there is a scenario change, the simulation generator determines whether it is an environmental change or an aircraft change, steps 90 and 94. For example, the scenario may introduce a weather change or another aircraft onto the radar display. The weather change could be a change in wind, velocity or direction, at different altitudes or a change in precipitation. These pending changes are then translated into instructions for updating the scenario steps 92 and 96. If an aircraft change was pending, the comparison module 22 checks the updated data of the work are of the generator for possible violations, step 104; otherwise the simulator generator returns to determine if a controller clearance is pending for the next aircraft under consideration.

Figure 5:
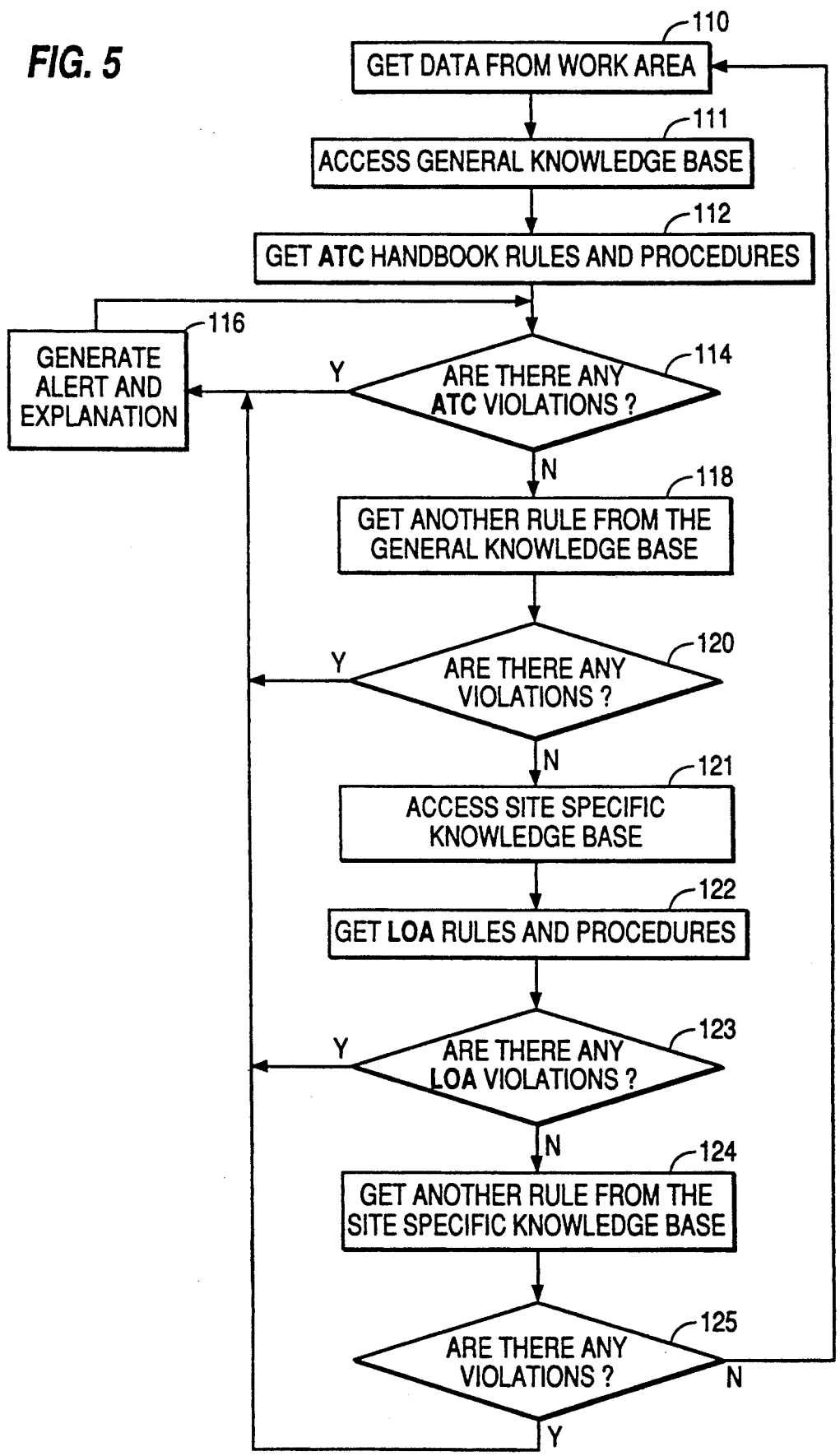
FIG. 5 is a flow diagram illustrating an implementation of the comparison module shown in FIG. 2.

As demonstrated by the simulation generator flow chart of FIG. 4, a call to the comparison module is initiated whenever an aircraft is updated. Comparison module 22 receives data from the work area of the generator and compares this data with data stored in knowledge base 24. The operation of the comparison module is illustrated by a flowchart in FIG. 5. By way of example, data received from work area 38, step 110, is first compared with ATC Handbook rules and procedures in the general knowledge base for possible violations, steps 111 and 112. The ATC Handbook is a government handbook for air traffic controllers which contains rules which apply to every airport facility in the country. These rules may be replaced with rules and procedures for different countries. If it is determined that a rule has been violated, comparison module 22 causes the simulated radar screen to display an alert message and an explanation of the alert in the instructor's window, steps 114 and 116. Other violations, such as minimum safe altitude warnings and aircraft performance characteristics, are also checked and processed by the expert system before checking for violations in the site-specific knowledge base, steps 118 and 120. Violations in the site-specific knowledge base such as site-specific letters-of-agreement violations, standard operating procedure violations, etc., are similarly checked and processed by the expert system before more data is retrieved from the work area, steps 121-125. Even if there are no rules or procedures violated, expert operating procedures for that scenario are compared to take advantage of a heuristic approach for teaching the user. If the user's command exhibits a poor technique, a guidance message will be issued via the instructor's window 42, step 116.

Figure 6:
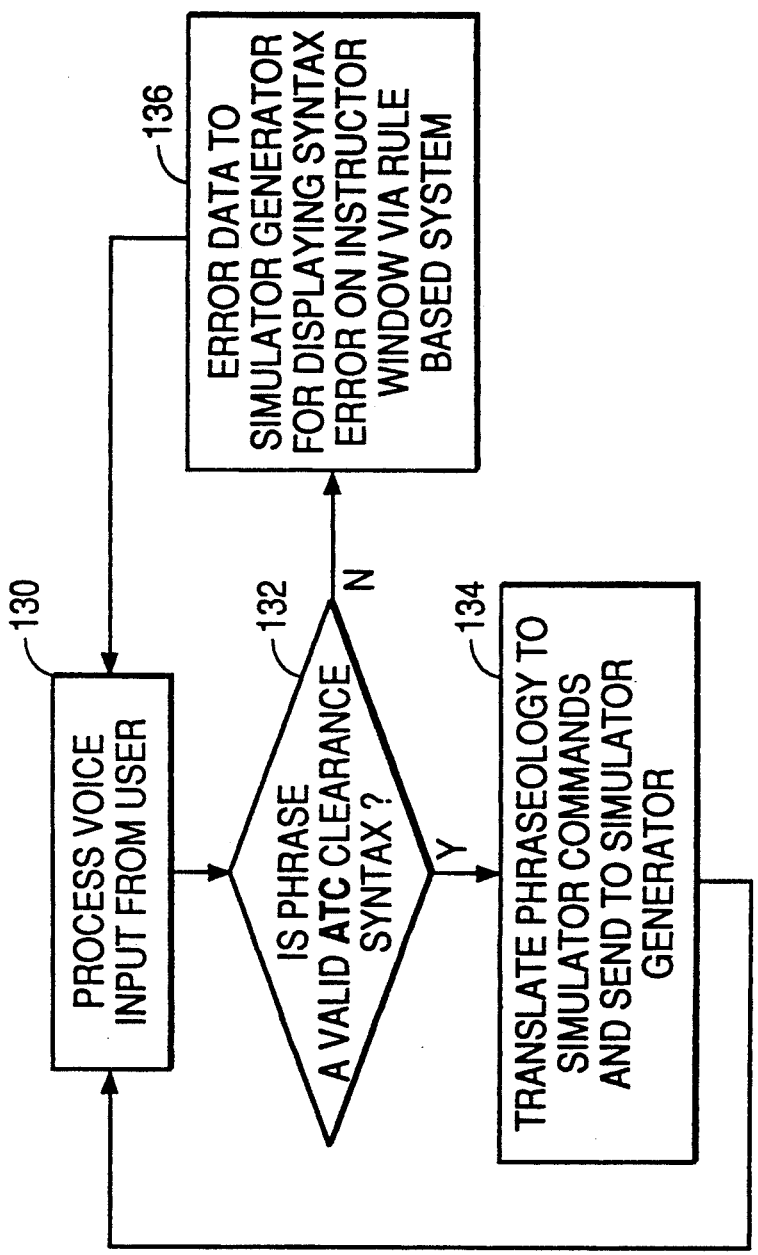
FIG. 6 is a flow diagram illustrating an implementation of a voice-recognition input command system.

As stated above, clearance commands are entered into the simulator generator via a voice recognition system which translates the voice of the user into digitized signals that are recognized by simulation generator 34 as command instructions. A flowchart providing an example for such a voice recognition system is illustrated in FIG. 6. Referring to the flow chart, the voice recognition system processes the user's verbal commands, step 130, which are in terms of air traffic control clearance phrases recognized by the industry. The system first tests to see if the phrase is a valid phrase, step 132. If the phrase has been worded incorrectly, an error message is sent to comparison module 22 via the simulation generator 34 for displaying the error in the instructor's window 42, step 136. Alternatively, the user can be alerted by way of the voice synthesizer. The voice recognition system then waits for the next input from the user, step 130. For a valid air traffic control clearance command, the voice-recognition system translates the phraseology into proper control signals for updating the simulation generator 34 and the work area 38, step 134.

As shown in FIG. 7, the entire workstation of an air traffic controller is simulated. In addition to display screen 28, unit 12 includes a control panel 49. Panel 49 may be controlled by a standard microcomputer such as an IBM Personal Computer for allowing the user to control the knobs and levers 50 associated with the simulated radar display for simulating the real environment of the air traffic control station. For example, one knob may be used for controlling the intensity of the screen. Other knobs may be used for increasing or decreasing the area displayed by the radar simulator or offset direction. The control panel, together with the graphic display screen, can be arranged to simulate any air traffic control workstation that is currently being used.

Unit 12 also includes a time line 52 on the radar simulator, indexing the scenario as it develops. Time line 52 serves as a marker so that if a suer or instructor wishes to view the consequences of a user's clearance command, a future point can be referenced for accelerating the scenario. In addition, time line 52 can serve as a marker for replaying a portion of the scenario.

Figure 8B:
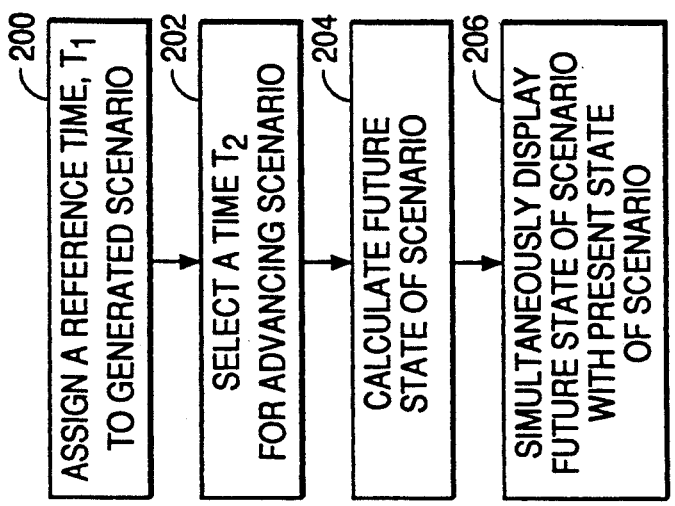
FIG. 8B is a flow diagram illustrating the operation of generating the scenario for a different, preselected period of time.
Figure 8A:
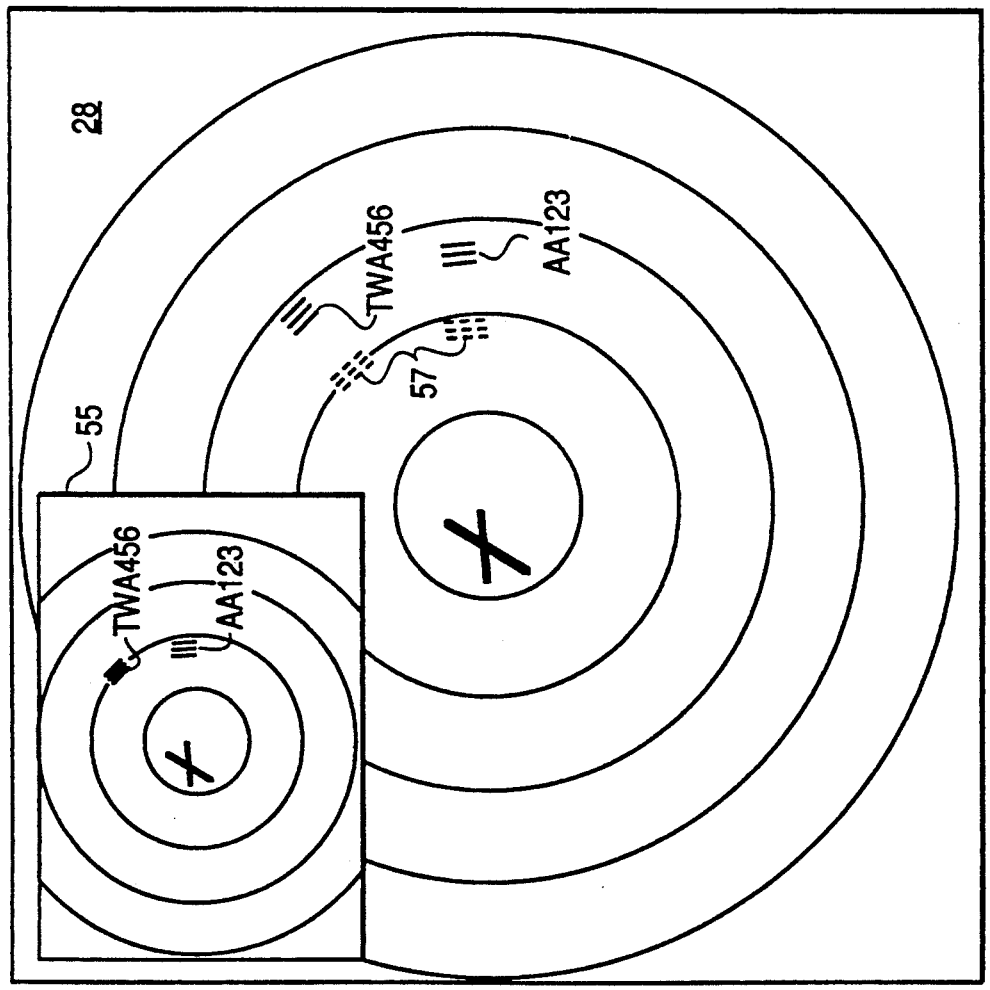
FIG. 8A is an illustration of a radar screen showing the flight pattern of two aircraft at a particular airport terminal and an inset on that screen for showing the flight pattern at a different preselected interval of time.
Figure 8C:
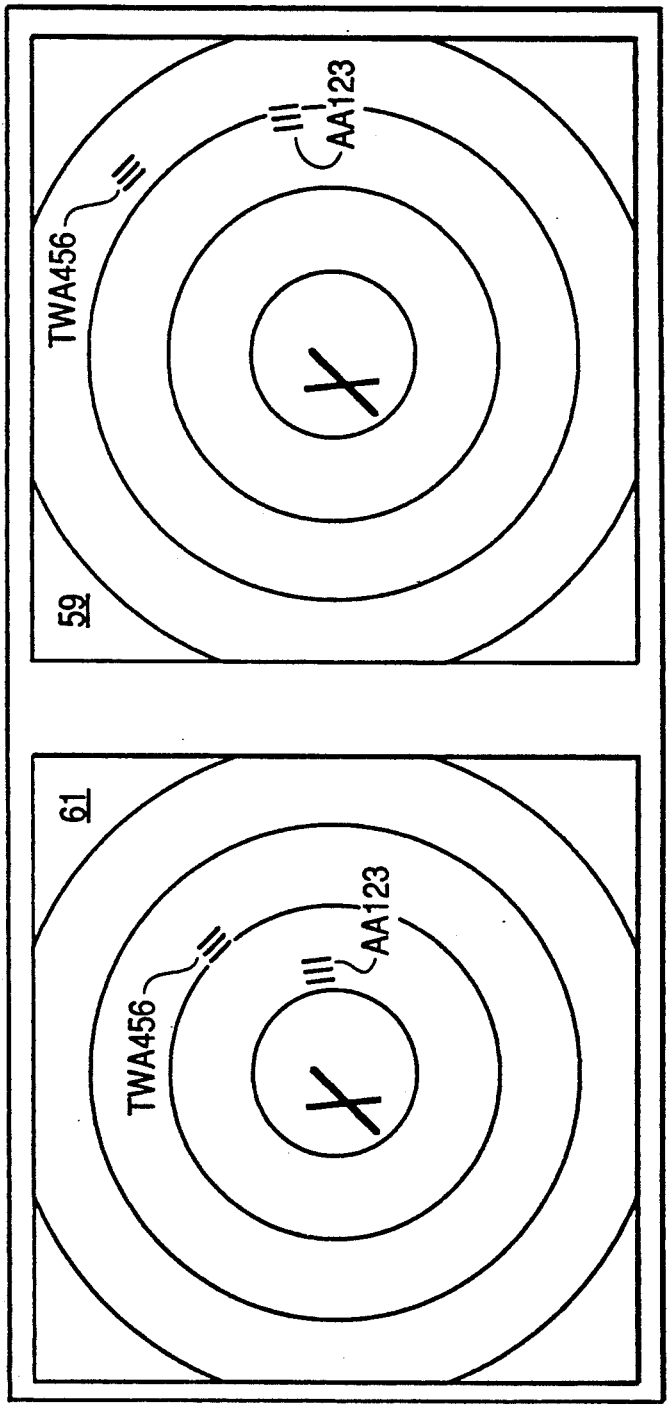
FIG. 8C is an illustration of two adjacent radar screens of the training system for simultaneously displaying a scenario at different intervals of time.
Figure 8:
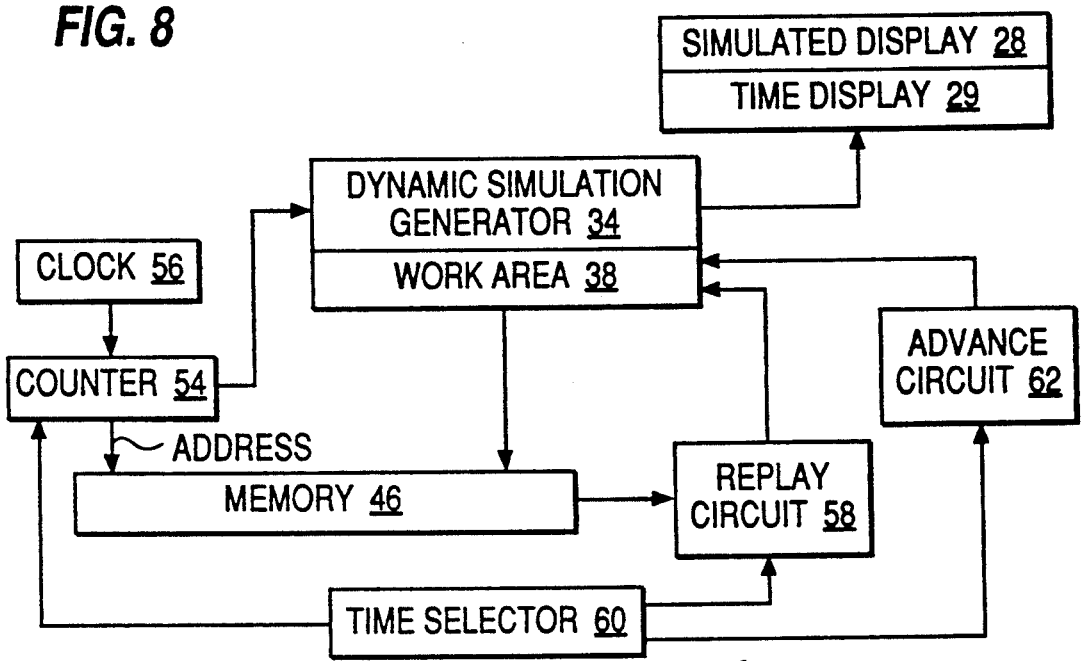
FIG. 8 is a schematic block diagram illustrating the operation of a time line for replaying or advancing the scenario.

The time indicated on time line 52 is generated by a counter 54, FIG. 8, which is driven by a clocking device 56 such as a crystal. The count generated by counter 54 is used by dynamic simulation generator 34 for displaying time on an inset on simulated radar display 28. The count of the counter is stored in memory 46 together with data in work area 38 for indexing the scenario in memory as it is recorded. When the user or instructor selects to replay the scenario, a replay circuit 58 is enabled by a time selector 60. The time selector 60 may be controlled by the user's terminal 32. The scenario is replayed by resetting the count of the counter which addresses the memory for selectively feeding back into the work area the stored scenario corresponding to the count on the counter. The recorded scenario is then displayed via dynamic simulation generator 34. Time selector 60 also resets the time displayed on simulated display 28.

If the user or instructor selects to advance the circuit, time selector 60 advances counter 50 and enables advance circuit 62. Advance circuit 62 causes work area 38 to advance the scenario to some predetermined period of time by using the current data for each aircraft in the work area to determine each aircraft's future position. This advance scenario is then displayed on simulated radar screen 28 via dynamic simulation generator 34.

Furthermore, future effects of a user's clearance can be constantly monitored by a smaller radar display 55 inset on display 28, as shown in FIG. 8A. Display 55 is used to show the positions of the aircraft during the scenario at a preselected instant in time. These positions are determined by assigning a clock indicating a reference time T1 to the scenario generated on display 28, as illustrated by block 200 of FIG. 8B. A period of time T2, such as +3 minutes, is then selected to advance the generated scenario to a future state of the scenario, block 202. The future state of the scenario is then calculated using the current heading and speed of each aircraft in the scenario and generated on display 55, blocks 204 and 206. Display 55 may also be used to look at a previous condition or to freeze the scenario at a predetermined interval of time. Preferably this inset is generated and controlled by the dynamic simulation generator 34 and mapping generator 43 of inference engine 37, FIG. 2.

Alternatively, ghost target images 57 (shown in phantom) for each aircraft can be selectively introduced onto display 28 to indicate the future position of the aircraft. Ghost target images 57 are also based on the aircraft's current heading and speed at some preselected future time. In some cases a particular color can be assigned to ghost target images 57 for systems that employ a color monitor to display the scenario.

The system may include two radar displays as shown in FIG. 8C. One radar display 59 is used for displaying the current aircraft's position. The other radar display 61 is used for indicating some future position of the aircraft based on current headings and speeds.

User 16 may select a particular site to be shown on display 28 by choosing the desired site from a list, not shown, when the menu labeled "site", FIG. 7, is selected by a cursor. The list of sites may include airports such as Boston, New York, Washington, or en route sites. A list for selecting a scenario to be generated for that particular site may also be chosen at that time. The scenario may be a scenario developed from actual aircraft information, as discussed above, concerning air traffic patterns which correspond to a particular site or a scenario that can be superimposed on any site. When a site is selected, the geographic boundaries for that particular site are displayed on simulated radar display 28 and the scenario commences. Navigational markers, such as visual omnirange locations, are also displayed. In other words, characteristics that are particular for each site are generated by the system using software rather than slides or film which has been specially engraved for that particular site.

Figure 9:
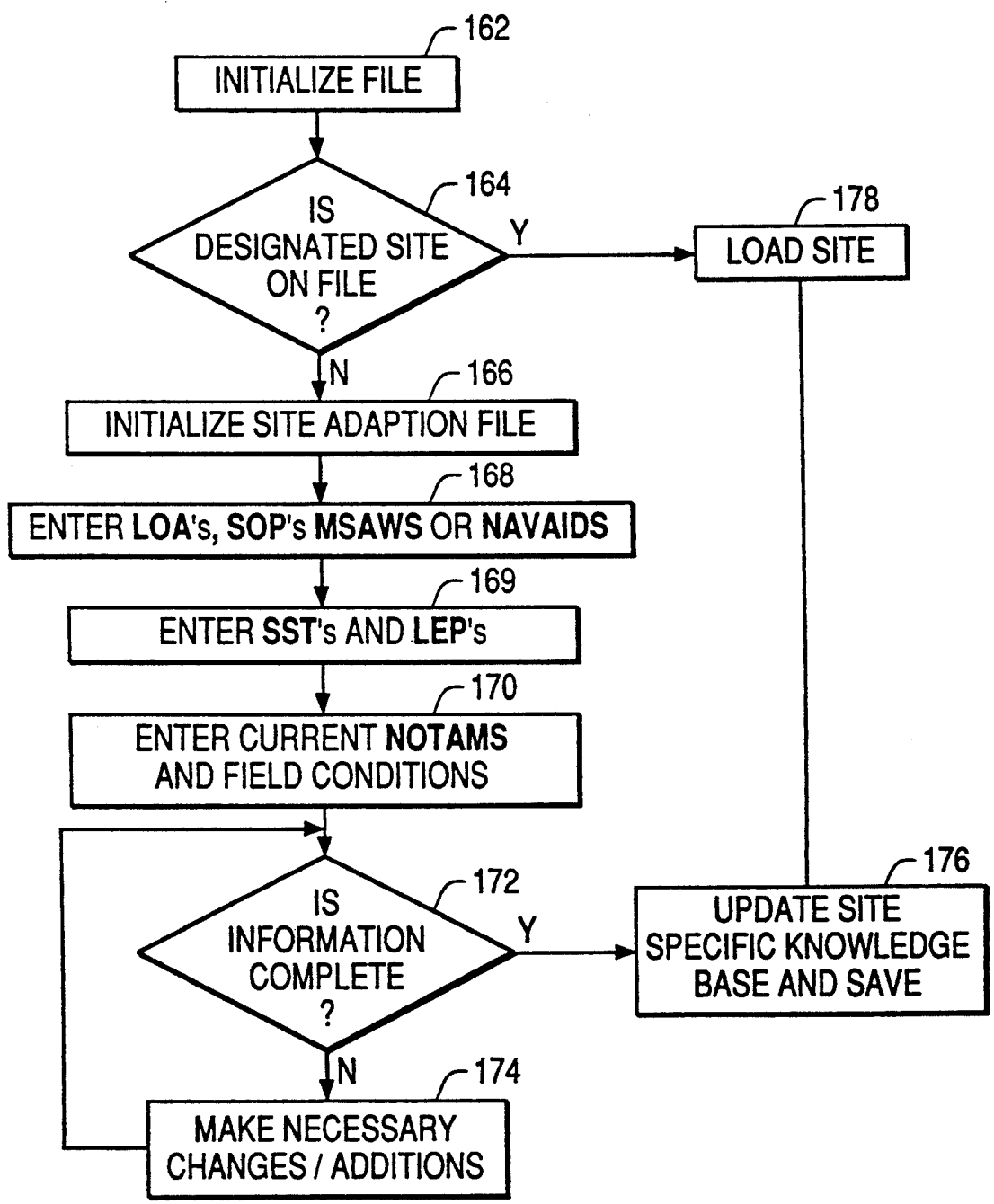
FIG. 9 is a flow diagram illustrating an implementation of changing the specifics at a particular site.

Generating sites using software also has the advantage of updating or modifying a particular site by initializing a site-adaption file, steps 164 and 166, as illustrated in the flow diagram in FIG. 9. A new file for creating a new site may also be created. Once the site adaption system is initialized, the site-specific knowledge base for a particular site as well as current NOTAMs and filed conditions, steps 168-170, are loaded into the initialized filed. After the necessary changes and additions have been made, the updated site-specific knowledge base is saved and that particular site is displayed on the simulated radar screen, steps 172, 174, 176, and 178. New files may alternately be loaded into the knowledge base.

Figure 10:
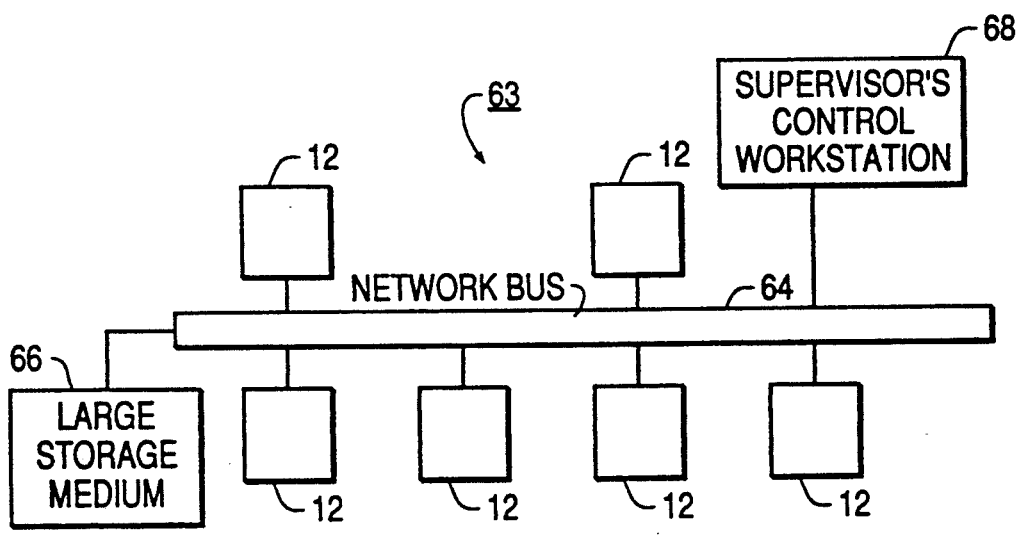
FIG. 10 is a schematic block diagram of a network of the unit of FIG. 1.

As shown in FIG. 10, the air traffic training system is expanded to a network 63 which includes a plurality of units 12. Units 12 are connected together by a broadband network bus 64 such as Ethernet or other network system. This network allows voice, video, and computer data to pass over bus 64. In this embodiment, the expert system and the knowledge base can be stored on a large storage medium 66 such as an optical Write Once Read Many (WORM). This storage medium may also be used to store the scenario data for each site selected, as well as the complete history of each training session for each user. With such a network, each user can learn the valuable lesson of teamwork by learning to hand off control of aircraft in their control sector to the users controlling different sectors. Additionally, the network 63 permits the expert system to be used to analyze scenarios which involve hand offs from one controller for one sector to another controller of another sector.

Network 63 can simulate the whole air traffic control system with each training unit simulating a geographical section of the network. Thus, the system gives the ability to provide different levels of terminal control as would be seen in a normal controller environment. For example, the network may include a departure terminal, arrival terminal, and en route control stations. Other valuable lessons, such as simultaneously training air traffic controllers rules and procedures for different sites, are also possible. This feature is particularly useful when air traffic controllers are reassigned or transferred to another site.

Network system 63 also includes a supervisor's control workstation 68. Supervisor's control workstation 68 is similarly connected to other user units 12 over network bus 64. In the preferred embodiment, supervisor's control workstation 68 is similar to unit 12, except that it can monitor or change the scenario displayed by any of the training units. In other words, supervisor's control workstation 68 can selectively change the environments or scenarios of any or all of the units 12. Workstation 68 can also update the NOTAMs, as well as request all of the alerts that have been issued by any of the individual training units or replay any of the scenarios.

Figure 11:
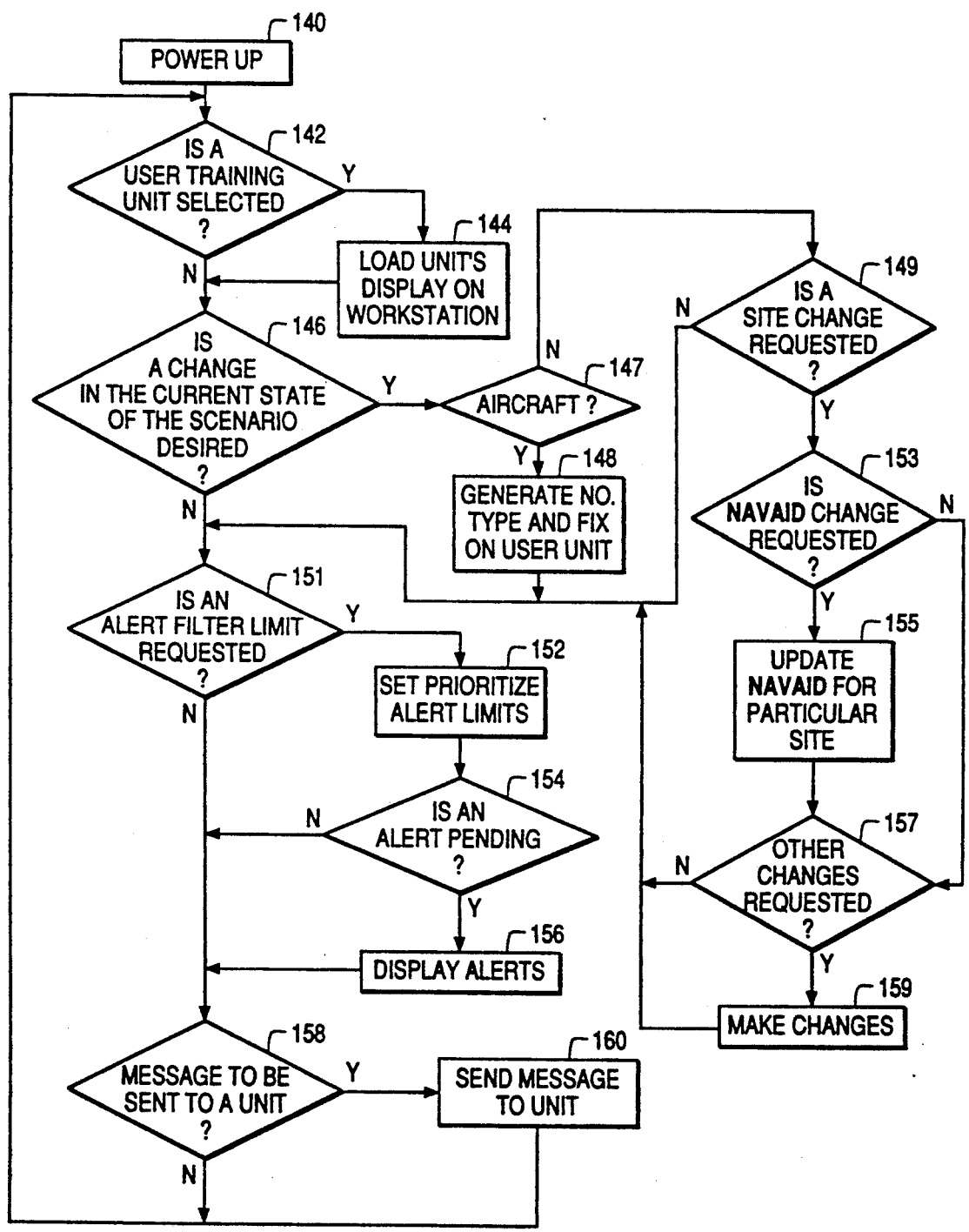
FIG. 11 is a flow diagram illustrating an implementation of the instructor control workstation shown in FIG. 10.

A flowchart illustrating the operations of an instructor control workstation is shown in FIG. 11. After being powered up, step 140, the workstation determines if an instructor has requested to monitor a particular training unit 12, step 142. The scenario displayed on that unit is then displayed by tying into that unit's dynamic simulation generator via network bus 64, step 144. The workstation 68 then looks to see if a scenario change for a particular site is desired by the operator, step 146; for example, introducing additional aircraft or environmental changes such as weather conditions, runway conditions, etc., steps 147-149, 153, 155, 157, and 159. Aircraft changes are made by sending the proper commands to that unit's dynamic simulation generator, step 148. Environmental changes are made by updating the NOTAM for that particular site, steps 157 and 159. NAVAIDS for a particular site may also be updated, steps 153 and 155. Workstation 68 also determines if the operator has requested alert messages that have been issued by one or more units, step 151. The workstation may be flagged as alerts occur at the individual units 12. These alerts are prioritized, step 152, and then displayed on the simulated radar screen of the workstation, steps 154 and 156, indicating which units had issued the alerts. Supervisor's workstation 68 may then determine if the operator wishes to send a message to one or all of units 12, step 158 and 160. Other tasks may also be performed by workstation 68, such as recalling and replaying a stored training session or updating the library of stored scenarios.

An air traffic control training system according to this invention can provide great versatility. For example, the simulator may be used to train student controllers, monitor controllers or analyze data corresponding to air traffic events in real time or in hindsight.

Although specific features of the invention are shown in some drawings and not others, this is for convenience only as each feature may be combined with any or all of the other features in accordance with the invention.

Persons of ordinary skill will recognize that modifications and variations may be made to this invention without departing from the spirit or scope of the general inventive concept. This invention in its broader aspects is therefore not limited to the specific details or representative methods and apparatus shown and described.

What is claimed is:

1. An air traffic control simulator in a data processing system, wherein said data processing system includes a radar memory means for storing previously generated radar information corresponding to an actual aircraft flight pattern including at least one position and heading of said actual aircraft, a verbal communications memory means for storing data corresponding to previously generated verbal communications between a pilot of the actual aircraft and an actual controller during the flight pattern, an input device for receiving input commands from at least one user, and a display apparatus having a display screen, and wherein said simulator may interact with the user to simulate an air traffic scenario, said simulator comprising:

radar input means for receiving radar data corresponding to the stored radar information;

voice input means for receiving voice data corresponding to the stored data for the verbal communications;

coordinating means for automatically coordinating the input radar data and the input voice data to generate coordinated data for producing one of said air traffic scenarios; and generating means for generating on said display screen at least one display image of said produced air traffic scenario including a representation of said actual aircraft indicating the position and heading.

2. The air traffic control simulator of claim 1, wherein said data processing system further includes a general knowledge base for storing common rules, operating procedures, general techniques, and emergency procedures applicable to said air traffic scenario simulations for said plurality of selectable sites, and a site-specific knowledge base for storing particular rules, procedures, site specific techniques, and local emergency procedures applicable to at least one of said plurality of selectable sites, and wherein the display apparatus displays at least one of a plurality of states of simulated air traffic scenarios, said simulator further comprising:

voice recognition means for receiving a controller command from the user for altering said state of said air traffic scenario; and a comparison module for comparing the rules and procedures of said general knowledge base and said site-specific knowledge base to at least one of the present state of the simulation of the traffic scenario and the controller command and for issuing a notice upon the failure of said user to observe any rule, procedure or technique in said knowledge bases.

3. The air traffic control simulator of claim 2 further including a selector means, responsive to input commands from said user, for selecting the position and heading of said aircraft to initialize said air traffic scenario in accord with one of the plurality of selectable sites.

4. The air traffic control simulator of claim 3 wherein said voice input means includes a voice recognition system, the air traffic control simulator further including:

voice generating means for generating, in response to an instruction from said coordinating means, a digitized voice response for said air traffic scenario, and selector means, responsive to input commands from said user, for selecting the position and heading of said aircraft to initialize said air traffic scenario in accord with one of the plurality of selectable sites.

5. The air traffic control simulator of claim 4 wherein when the user inputs a command, said generating means generates a new display image for said air traffic scenario including a representation of said aircraft indicating a new position and heading and said voice generating means generates a digitized voice response for said new display image.

6. The air traffic control simulator of claim 1 further including a voice generating means for generating, in response to an instruction from said generating means, a digitized voice response for said air traffic scenario.

7. The air traffic control simulator of claim 1 wherein said radar data includes data identifying said actual aircraft and data indicating the time of the identified position and heading of said actual aircraft.

8. The air traffic control simulator of claim 1 wherein said voice data includes data indicating the time of said verbal communications.

9. The air traffic simulator of claim 1 wherein said coordinating means includes:

timer means for recognizing an initial time for said input radar data and an initial time for said input voice data and for maintaining a synchronization between subsequent time intervals of said input radar data and subsequent time intervals of said input voice data, and display image coordinating means for coordinating a plurality of display images for said air traffic scenario using said synchronized time intervals of said input radar data and said input voice data.

10. An air traffic control simulator in a data processing system adapted for use with a plurality of selectable sites, wherein said data processing system includes an input device for receiving input commands from at least one user, a display apparatus having a display screen to display at least one of a plurality of states of simulated air traffic scenarios, a general knowledge base for storing common rules, procedures and accepted techniques applicable to said air traffic scenario simulations for said plurality of selectable sites, and a site-specific knowledge base for storing particular rules and procedures applicable to at least one of said plurality of selectable sites, and wherein said simulator may interact with the user to analyze an air traffic scenario, said simulator comprising:

first storage means for storing previously generated radar information correspond to at least one actual aircraft and identifying at least one position and heading of said actual aircraft, and data corresponding to previous verbal communications between a pilot of the actual aircraft and an actual controller;

radar input means for receiving radar data corresponding to the radar information;

voice input means for receiving voice data corresponding to the data for the previous verbal communications;

synchronizing means for synchronizing the input radar data and the input voice data to generate synchronized data for producing one of said air traffic scenarios;

second storage means for storing the synchronized data;

selector means, responsive to input commands from said user, for selecting an initial position and heading of said actual aircraft;

initializing means for initializing the air traffic scenario corresponding to said selected position and heading of said actual aircraft and in accord with one of the plurality of selectable sites;

generating means for generating on said display screen an initial state of said air traffic scenario including a representation of said actual aircraft indicating the selected position and heading;

receiving means for receiving a second position and heading of said actual aircraft from said synchronized data for altering said state of said air traffic scenario; and a comparison module for comparing the rules and procedures of said general knowledge base and said site-specific knowledge base to at least one of the present state of the simulation of the traffic scenario and for issuing an alert upon the immediate or foreseeable error in said coordinated data indicated by a failure to observe any rule or procedure in said knowledge bases.

11. The air traffic control simulator of claim 10 wherein said radar data includes data identifying said actual aircraft and data indicating the time of the identified position and heading of said actual aircraft.

12. The air traffic control simulator of claim 11 wherein said voice data includes data indicating the actual time of said verbal communications.

13. An air traffic control system including a memory means for storing previously generated radar information corresponding to an actual aircraft flight pattern including at least one position and heading of said actual aircraft, and data corresponding to previously generated verbal communications between a pilot of the actual aircraft and an actual controller during the flight pattern and a plurality of air traffic control simulators each adapted for use with a plurality of selectable sites, wherein each of said simulators includes an input device for receiving input commands from at least one user, a display apparatus having a display screen to display at least one of a plurality of states of simulated air traffic scenarios, a general knowledge base for storing common rules, procedures, and accepted techniques applicable to said air traffic scenario simulations for said plurality of selectable sites, and a site-specific knowledge base for storing particular rules and procedures applicable to at least one of said plurality of selectable sites, and wherein each of said simulators may interact with the user to analyze an air traffic scenario from radar data and voice data, each of said simulators comprising:

radar input means for receiving the radar data, wherein the radar data corresponds to the position and heading of said actual aircraft within a predetermined range of a selected site;

voice input means for receiving the voice data;

synchronizing means for synchronizing the input radar data and the input voice data to generate synchronized data for producing one of said air traffic scenarios;

storage means for storing the synchronized data;

selector means, responsive to input commands from said user, for selecting an initial position and heading of said actual aircraft;

initializing means for initializing the air traffic scenario corresponding to said selected position and heading of said actual aircraft and in accord with one of the plurality of selectable sites;

generating means for generating on said display screen an initial state of said air traffic scenario including a representation of said actual aircraft indicating the selected position and heading;

receiving means for receiving a second position and heading of said aircraft from said synchronized data for altering said state of said air traffic scenario; and a comparison module for comparing the rules and procedures of said general knowledge base and said site-specific knowledge base to at least one of the present state of the simulation of the traffic scenario and for issuing an alert upon the immediate or foreseeable error in said coordinated data indicated by a failure to observe any rule or procedure in said knowledge bases, wherein when said heading and position of said actual aircraft indicates that said actual aircraft is beyond the predetermined range of a selected site corresponding to one of said air traffic control simulators, said generating means of said one of said air traffic control simulators transmits a message to said generating means of another air traffic control simulator for said generating means of said new air traffic control simulator to generate on said display screen of said new air traffic control simulator at least one display image of said produced air traffic scenario.

14. A method for simulating an air traffic scenario in a data processing system adapted for use with a plurality of selectable sites, wherein said data processing system is comprised of a radar memory means for storing previously generated radar information corresponding to an actual aircraft flight pattern including at least one position and heading of said actual aircraft, a verbal communications memory means for storing data corresponding to previously generated verbal communications between a pilot of the actual aircraft and an actual controller during the flight pattern, a simulator including an input device for receiving input commands from at least one user, a display apparatus having a display screen to display at least one of a plurality of states of simulated air traffic scenarios, a general knowledge base for storing common rules, procedures, and accepted techniques applicable to said air traffic scenario simulations for said plurality of selectable sites, and a site-specific knowledge base for storing particular rules and procedures applicable to at least one of said plurality of selectable sites, and wherein said simulator interacts with the user to analyze an air traffic scenario from radar data and voice data, the method comprising the steps of:

receiving the radar data corresponding to the stored radar information, wherein the radar information identifies the position and heading of said actual aircraft within a predetermined range of a selected site;

receiving the voice data corresponding to the stored data for the verbal communications;

synchronizing the radar data and the voice data to generate synchronized scenario data for producing one of said air traffic scenarios;

storing the synchronized scenario data;

selecting, responsive to input commands from said user, an initial position and heading of said aircraft;

initializing the air traffic scenario corresponding to said selected position and heading of said actual aircraft and in accord with one of the plurality of selectable sites;

generating, in accordance with the synchronized scenario data, on said display screen on initial state of said air traffic scenario including a representation of said actual aircraft indicating the selected position and heading;

altering, in accordance with said synchronized scenario data, the position and heading of said aircraft which alters said state of said air traffic scenario;

comparing the rules and procedures of said general knowledge base and said site-specific knowledge base to at least one of the present state of the air traffic scenario; and issuing an alert upon the immediate or foreseeable error in said synchronized scenario data indicated by a failure to observe any rule or procedure in said knowledge bases.

15. The method of claim 14 wherein said radar data includes a plurality of radar data entries, each having a time, and said voice data includes a plurality of voice data entries, each having a time, and wherein said synchronizing step is comprised of the substep of:

determining whether the time of a one of the plurality of radar data entries is equal to the time of a one of the voice data entries; and creating a simulated scenario data record from said one of the radar data entries and said one of the voice data entries when it has been determined that the time of one of the radar data entries is equal to the time of the voice data entry, or creating a creating a simulated scenario data record from said one of the radar data entries or said one of the voice data entries when it has been determined that the time of the one of the radar data entries and the time of the one of the voice data entries is not equal.

* * * * *

UNITED STATES PATENT AND TRADEMARK OFFICE
CERTIFICATE OF CORRECTION

PATENT NO. : 5,200,901
DATED : April 6, 1993
INVENTOR(S) : Arthur Gerstenfeld, et al.

It is certified that error appears in the above-indentified patent and that said Letters Patent is hereby corrected as shown below:

Claim 15, column 24, line 17, delete "creat-"
line 18, delete "ing a".

Signed and Sealed this

Fourth Day of January, 1994

Attest:

BRUCE LEHMAN

*Attesting Officer*  *Commissioner of Patents and Trademarks*